United States Patent
Bao et al.

(10) Patent No.: US 11,556,836 B1
(45) Date of Patent: Jan. 17, 2023

(54) SYSTEM AND METHOD FOR MATCHING SPECIALISTS AND POTENTIAL CLIENTS

(71) Applicant: Intuit Inc., Mountain View, CA (US)

(72) Inventors: Xinli Bao, Palo Alto, CA (US); Neil Jelmert Jorgensen, San Jose, CA (US); Bharatwaja Namatherdhala, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 1092 days.

(21) Appl. No.: 15/894,001

(22) Filed: Feb. 12, 2018

(51) Int. Cl.
*G06Q 10/06* (2012.01)
*G06N 20/00* (2019.01)

(52) U.S. Cl.
CPC ........... *G06N 20/00* (2019.01); *G06Q 10/063* (2013.01)

(58) Field of Classification Search
CPC .............................. G06N 20/00; G06Q 10/063
See application file for complete search history.

(56) References Cited

U.S. PATENT DOCUMENTS

| | | | |
|---|---|---|---|
| 5,752,237 A | 5/1998 | Cherny | |
| 7,483,847 B1 | 1/2009 | Rymer et al. | |
| 8,799,124 B1 | 8/2014 | Daken et al. | |
| 8,805,844 B2 * | 8/2014 | Schorzman | H04L 51/04 707/738 |
| 2001/0037219 A1 | 11/2001 | Malik | |
| 2002/0169652 A1 * | 11/2002 | Busche | G06Q 30/02 706/21 |
| 2005/0114279 A1 * | 5/2005 | Scarborough | G06Q 10/1053 705/321 |
| 2006/0059021 A1 | 3/2006 | Yulman et al. | |
| 2008/0222295 A1 | 9/2008 | Robinson et al. | |
| 2009/0204531 A1 | 8/2009 | Johnson | |
| 2009/0276340 A1 | 11/2009 | Knapp | |
| 2011/0055035 A1 | 3/2011 | Koskay et al. | |

(Continued)

OTHER PUBLICATIONS

R. Manongdo and G. Xu, "Applying client churn prediction modeling on home-based care services industry," 2016 International Conference on Behavioral, Economic and Socio-cultural Computing (BESC), 2016, pp. 1-6, doi: 10.1109/BESC.2016.7804503. (Year: 2016).*

(Continued)

*Primary Examiner* — Sun M Li
(74) *Attorney, Agent, or Firm* — Paradice & Li LLP

(57) ABSTRACT

Potential client/small business data and specialist profile data for multiple, and in various embodiments, hundreds, thousands, tens of thousands, hundreds of thousands, millions, tens of millions, or even hundreds of millions or more, potential clients/small businesses and specialists are used to train one or more matching models in an offline training environment using machine learning techniques. Once the one or more matching models are trained, the one or more matching models are used in an execution environment to process a given user's data and available specialist data to identify one or more available specialists determined to be a good match for the user. The user is then provided specialist recommendation data listing the matched available specialists and, in some cases, the user is provided one or more communication mechanisms for connecting with matched available specialists selected by the user.

16 Claims, 8 Drawing Sheets

400

| SPECIALIST RECOMMENDATION USER INTERFACE 410 | | | |
|---|---|---|---|
| SPECIALIST NUMBER 411 | SPECIALIST NAME 412 | SPECIALIST DESCRIPTION 413 | SPECIALIST SCORE 414 |
| 421 | Alfred Doe | In business for 25 years. | 0.96855 |
| 422 | Barbara Doe | Located close to your zip code. | 0.94575 |
| 423 | Charles Doe | Familiar with your application suite. | 0.92675 |
| 424 | Dorothy Doe | Assists other users similar to you. | 0.92560 |
| 425 | Edgar Doe | Performs training of staff. | 0.91665 |

(56) References Cited

U.S. PATENT DOCUMENTS

| | | | |
|---|---|---|---|
| 2011/0119264 A1* | 5/2011 | Hu | G06Q 10/00 |
| | | | 715/758 |
| 2012/0330822 A1 | 12/2012 | McGovern et al. | |
| 2013/0046704 A1 | 2/2013 | Patwa et al. | |
| 2014/0195549 A1 | 7/2014 | Anh et al. | |
| 2015/0127565 A1 | 5/2015 | Chevalier et al. | |
| 2016/0188587 A1 | 6/2016 | Martin et al. | |
| 2017/0060982 A1* | 3/2017 | Akkiraju | G06Q 30/02 |
| 2017/0091629 A1* | 3/2017 | Li | G06N 5/04 |
| 2017/0154314 A1 | 6/2017 | Mones et al. | |
| 2017/0270156 A1 | 9/2017 | Ahire | |
| 2017/0329856 A1* | 11/2017 | Jiang | H04L 67/26 |
| 2018/0150571 A1 | 5/2018 | Douglas et al. | |
| 2019/0052720 A1* | 2/2019 | Guo | G06F 3/0483 |
| 2019/0080347 A1 | 3/2019 | Smith | |
| 2020/0042610 A1 | 2/2020 | Boles et al. | |

OTHER PUBLICATIONS

A. Shirazi, J. Hu, M. Singh, M. Squillante and A. Mojsilovic, "A framework for combined bayesian analysis and optimization for services delivery," 2009 IEEE/INFORMS International Conference on Service Operations, Logistics and Informatics, 2009, pp. 382-387, doi: 10.1109/SOLI.2009.5203963. (Year: 2009).*

H. Vafaie, M. Shaughnessy, T. Bethem and J. Burton, "Selection process of intelligent decision support tool for real-time monitoring system," 14th IEEE International Conference on Tools with Artificial Intelligence, 2002. (ICTAI 2002). Proceedings., 2002, pp. 173-180, doi: 10.1109/TAI.2002.1180802. (Year: 2002).*

Quotify Technology, Inc., www.quotify.com, 2011, 2 pages.

Langley et al., "Approaches to Machine Learning," Carnegie-Mellon University, Pittsburgh, PA, Department of Computer Science, Feb. 16, 1984, 28-pages (Year: 1984).

* cited by examiner

ILLUSTRATIVE BUSINESS ATTRIBUTES 300A

COMPANY IDENTIFIER
TRANSACTION MANAGEMENT SYSTEM IDENTIFIER
SUBSCRIPTION TYPE
CHANNEL
MIGRATOR TYPE
BILLING CODE
INDUSTRY TYPE
ZIP CODE
STATE
PAYROLL ATTACHED
PAYROLL ATTACH DATE
PAYROLL CANCELLED
PAYMENT ATTACHED
PAYMENT ATTACH DATE
PAYMENT CANCELLED
PAYMENTS PRODUCT
PAYMENTS CHANNEL
PAYMENTS INACTIVE DATA
FINANCIAL STRENGTH RATING
NUMBER OF YEARS IN BUSINESS
SEARCH SESSION
PROFILE
SPECIALIST IDENTIFIER
COMPANY IDENTIFIER
SEARCH RANK
SPECIALIST PROFILE VIEWED
CONNECTED INDICATION
SEARCH DATE AND TIME
CONNECTION DATE AND TIME
MESSAGE DATE AND TIME
SOCIAL LINK CLICK DATE AND TIME
PHONE NUMBER CLICK DATE AND TIME
WEBSITE CLICK DATE AND TIME
LAST MONTH PAYMENTS RECEIVED
LAST MONTH INVOICE SENT
NUMBER OF TRANSACTIONS
NUMBER OF TRANSACTIONS TREND
NUMBER OF CUSTOMERS
NUMBER OF CUSTOMERS TREND
NUMBER OF VENDORS
NUMBER OF VENDORS TREND
NUMBER OF EMPLOYEES
NUMBER OF EMPLOYEES TREND
CASH FLOW STATUS
INVENTORY
APPLICATIONS USAGE
SELF-HELP USAGE
SUPPORT CALL

FIG. 3A

ILLUSTRATIVE SPECIALIST ATTRIBUTES 300B

```
SPECIALIST IDENTIFIER
DISPLAY PROFILE IDENTIFIER
DISPLAY PROFILE STRENGTH
CERTIFICATION
ZIP CODE
GEOCODING
RURAL/SUBURB
WEBSITE
NUMBER OF CHARACTERS IN ABOUT ME
YEARS IN BUSINESS
SERVICES PROVIDED
SERVICE TYPE
NUMBER OF INDUSTRIES SERVED
INDUSTRY TYPE
LANGUAGES
SOCIAL SITES LISTED
PROFESSIONAL DESIGNATIONS
NUMBER OF APPLICATIONS EXPERTISE DATA
APPLICATIONS TYPE EXPERTISE
PROFILE PICTURE
SPECIALIST TENURE
SPECIALIST REVIEWS
NUMBER OF SPECIALIST REVIEWS DATA
AVERAGE SPECIALIST RATING
AVERAGE NUMBER OF CHARACTERS IN A SPECIALIST REVIEW
MEDIAN NUMBER OF CHARACTERS IN A SPECIALIST REVIEW
TOTAL NUMBER OF CHARACTERS IN SPECIALIST REVIEWS
SPECIALIST RESPONSIVENESS
EXPERTISE
VALUE
FIRMOGRAPHICS
SPECIALIST NUMBER OF CONNECTIONS
FIRM TENURE
FIRM CLIENT
```

| SPECIALIST RECOMMENDATION USER INTERFACE 410 | | | |
|---|---|---|---|
| SPECIALIST NUMBER 411 | SPECIALIST NAME 412 | SPECIALIST DESCRIPTION 413 | SPECIALIST SCORE 414 |
| 421 | Alfred Doe | In business for 25 years. | 0.96855 |
| 422 | Barbara Doe | Located close to your zip code. | 0.94575 |
| 423 | Charles Doe | Familiar with your application suite. | 0.92675 |
| 424 | Dorothy Doe | Assists other users similar to you. | 0.92560 |
| 425 | Edgar Doe | Performs training of staff. | 0.91665 |

FIG. 4

SYSTEM AND METHOD FOR MATCHING SPECIALISTS AND POTENTIAL CLIENTS

BACKGROUND

Finding the right specialists, such as bookkeepers, accountants, payroll experts, docketing specialists, paralegals, and the like can be a daunting task for many potential clients of these specialists. This situation has become even more problematic with the emergence of the Internet, service and specialist listings, review sites, and malicious or false reviews and ratings abundantly available through the Internet.

In an effort to get some assistance in finding a good specialist, many people turn to friends and colleagues for referrals. However, these referrals/recommendations are often based on the needs of, and services provided to, the referrer rather than the specific needs of the requesting party. In some cases, potential clients may search an online directory of specialists and/or ratings systems. However, while of some use, specialist directories and ratings systems are often limited to only those specialists that pay to be listed, or that are chosen based on criteria that may, or may not, be relevant. In addition, specialist directories and rating systems are typically of little or no use in helping the potential client identify what specialty is required and what qualifications within a specialty are needed, not to mention a complete lack of any indication of a professional or personal connection. Finally, as also noted above, thanks largely to the emergence of the Internet as the preferred platform for these specialist directories and rating systems, specialist directories and rating systems are often very susceptible to malicious or false reviews and ratings data, along with other forms of fraud.

However, as difficult as it can be to wade through the mass of information, and often misinformation, available through the Internet, finding the "right" specialist is often a critically important task. This is because finding the wrong specialist, or not using a specialist when one is needed, can result in bad decisions, violations of regulations and laws, and even civil and criminal liability. Consequently, despite the fact that currently finding the right specialist is a complicated and often painful and expensive task, it is a task that for most people must be addressed.

One specific illustrative example of an instance where it is particularly critical to find the right specialist is when the potential client is a small business or small business owner. It is particularly important that a small business owner find the right specialists due to the nature of running a business and the liabilities and responsibilities associated with conducting business. However, it can be very difficult for a small business owner to find the right specialist because, almost by definition, the small business owner is busy running the business and typically does not have large amounts of time to devote to the process. In addition, the small business owner may not know what "type" of specialist they need, e.g., a bookkeeper, a certified accountant, or a tax attorney, or even that they need a specialist at all. Further, even when the type of specialist needed is known, the small business owner may not know what sub-specialties and/or qualifications of the specialists will be of most use, e.g., a tax attorney specializing in state, local, sales, or federal tax. Finally, the small business owner must also find a specialist with whom the small business owner is likely to connect, at least on a professional level, if not on a personal level.

Given that, by definition, most small business owners have little or no knowledge of the specialty for which they are seeking the specialist, and even less knowledge of the various nuances of the specialists and their qualifications, small business owners are often left with, at best, guess work and word-of-mouth mechanisms for finding the "right" specialist. Given the lack of precision and limited range of these methods for choosing specialists, it is not surprising that many small business owners often settle for less than ideal specialists, or in some cases do not even know they have settled for less than ideal specialists. As a result, all too often, the small business owners end up wasting significant amounts of time trying out, and letting go of, multiple specialists. This, in turn, makes the small business less efficient and less competitive.

In addition, various aspects of operating a small business introduce additional complexity and issues that are often not related to the small business owner's core competency, or even well understood by the small business owner. For instance, government regulation often introduces complexity that can cause a corresponding increase on the operational demands and financial structures of businesses subject to such regulations. Small businesses in particular are often burdened by complex regulations that are designed to regulate large organizations. However, unlike the large organizations, the small businesses often lack the substantial employee staff required to implement regulatory compliance measures. As a result, businesses, and small businesses in particular, often need part time assistance from one or more specialist service providers, such as accountants, lawyers, bookkeepers, and human resources specialists that can take over these specialized tasks and thereby allow the small business owner to focus on the business of the business.

In addition, finding the right specialists is often critical to a small business owner because non-compliance with business related regulations, such as tax and public safety regulations, can result in significant fines or other penalties, including criminal charges. The cost of compliance with business related regulations typically represents a more significant burden to smaller organizations than to larger ones. In addition, the threat of financial, civil, and criminal penalties is often far more personal for the small business owner. However, by enlisting the services of the right specialist, typically on a part-time or contractor basis, a small business owner can reduce these fixed costs.

For these and many other reasons, it is critical for many people, i.e., potential clients, and particularly for small businesses, to connect with one or more specialists that are well matched to the person's/small business's needs, and with whom the person/small business owner is likely to connect.

Consequently, there is currently a significant need in the potential client and specialist community for a technical solution to the technical problem of identifying the specialist needs of a given potential client or small business and then connecting the potential client or small business with the right specialist for that potential client or small business in an efficient and effective way. In addition, as noted above, this technical problem has become even more problematic and urgent in light of the emergence of the Internet, service and specialist listings, review sites, and malicious or false reviews and ratings data readily and abundantly available through the Internet.

SUMMARY

Embodiments of the present disclosure provide a technical solution to the technical problem of identifying the specialist needs of a given potential client or small business and then connecting the potential client or small business with the right specialist for that potential client or small business.

In one embodiment, the technical solution includes obtaining data management system data, such as small business management system data, associated with multiple users of the data management system, such as small business owners or other potential clients. In one embodiment, specialist profile data for multiple specialists associated with the users of the data management system is also obtained. In one embodiment, the data management system data and specialist profile data are then used to train one or more potential client-specialist matching models using machine learning techniques. In various embodiment, the potential client-specialist matching models include one or more of, a random forest model, a multiclass Support Vector Machine and decision tree model, or a logistic regression model. In one embodiment, once trained, the one or more potential client-specialist matching models are used to identify specialists probabilistically determined to be good matches for specific potential clients. Specialist recommendations for the specific potential clients are then provided to the specific potential clients in the form of specialist recommendation data. In one embodiment, the potential clients are also provided one or more mechanisms for communicating with the recommended specialists.

Consequently, and as discussed in more detail below, the disclosed embodiments of the present disclosure provide an effective, efficient, and highly versatile technical solution to the technical problem in the potential client and small business community of identifying the specialist needs of a given potential client or small business and then connecting the potential client or small business with the right specialist for that potential client or small business.

In addition, as discussed above, and discussed in more detail below, the disclosed embodiments of the present disclosure address, and mitigate, the negative impact of the Internet on the technical problem of identifying the specialist needs of a given potential client or small business brought about by the use of the Internet as the preferred platform for specialist directories, service and specialist listings, review sites, and the malicious or false reviews and ratings data readily and abundantly available through the Internet.

BRIEF DESCRIPTION OF THE DRAWINGS

FIG. 3A is an illustrative listing of sample potential client attributes for the specific illustrative instance where the potential client is a small business, in accordance with one embodiment;

FIG. 3B is an illustrative listing of sample specialist, or available specialist, attributes, in accordance with one embodiment;

FIG. 4 is an illustrative example of a user interface including an interface display generated using specialist recommendation data, in accordance with one embodiment;

Figure 1:
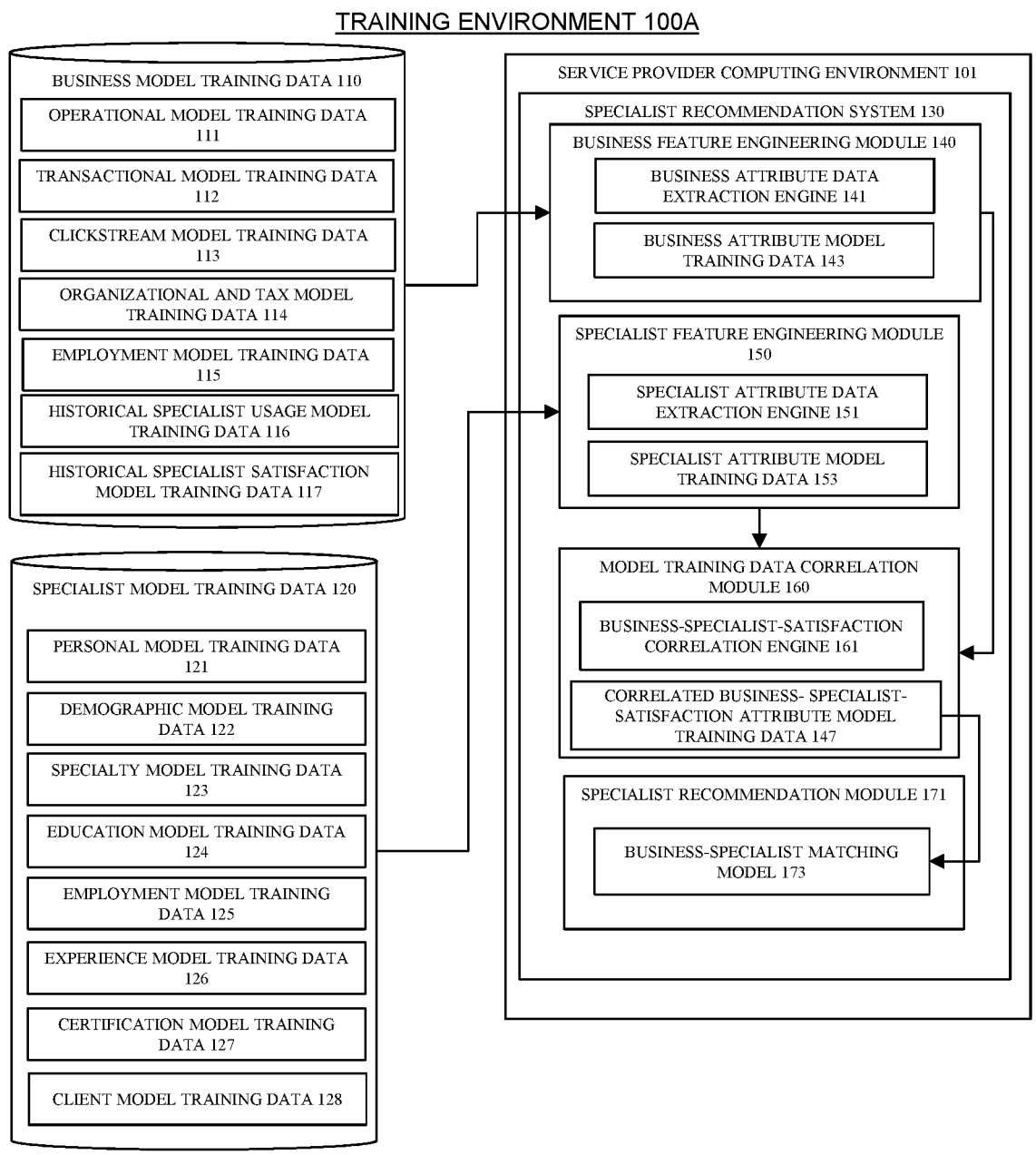
FIG. 1 is a functional block diagram of a training environment for implementing offline model training of a method and system for matching specialists and potential clients in accordance with one embodiment where the potential client is a small business.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying figures, which depict one or more exemplary embodiments. Embodiments may be implemented in many different forms and should not be construed as limited to the embodiments set forth herein, shown in the figures, and/or described below. Rather, these exemplary embodiments are provided to allow a complete disclosure that conveys the principles of the invention, as set forth in the claims, to those of skill in the art.

Herein, a data management system can be, but is not limited to, any system or application implemented on a computing system, accessed through one or more servers, accessed through a network, accessed through a cloud, and/or provided through any system or by any means, as discussed herein, and/or as known in the art at the time of filing, and/or as developed after the time of filing, that gathers data from one or more sources and/or has the capability to analyze and categorize at least part of the data.

Herein, a financial management system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers financial data, including financial transactional data, from one or more sources and/or has the capability to analyze and categorize at least part of the financial data.

As used herein, the term financial management system includes, but is not limited to the following: computing system implemented, and/or online, and/or web-based, personal and/or business financial management systems, services, packages, programs, modules, or applications; computing system implemented, and/or online, and/or web-based, personal and/or business tax preparation systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filling or as developed later.

Specific examples of financial management systems include, but are not limited to the following: QuickBooks™, available from Intuit, Inc. of Mountain View, Calif.; QuickBooks On-Line™, available from Intuit, Inc. of Mountain View, Calif.; QuickBooks Self-Employed available from Intuit, Inc. of Mountain View, Calif.; Mint™, available from Intuit, Inc. of Mountain View, Calif.; Mint On-Line™, available from Intuit, Inc. of Mountain View, Calif.; Turbo-Tax™, available from Intuit, Inc. of Mountain View, Calif., and/or various other financial management systems discussed herein, and/or known to those of skill in the art at the time of filing, and/or as developed after the time of filing.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to, the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given application as that application is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. The hardware systems may employ processing logic that includes one or more processors, microprocessors, multi-core processors, and/or Field Programmable Gate Arrays (FPGAs) to execute operations disclosed herein. One or more memory (volatile and/or non-volatile) may be communicatively coupled to the processing logic to store instructions to execute operations and/or store data. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the terms "business" and "businesses" are used to denote parties whose data is obtained and used as offline training data to train one or more attribute matching models in an offline environment. In contrast, as used herein the terms "potential client," "user," "small business," "user's business," "given user," and "given business" are used to denote a specific individual party whose data is analyzed by the disclosed method and system for matching specialists and potential clients in an online runtime/execution environment and, in one embodiment, whose post recommendation data is used as online training data to train one or more attribute matching models in an online environment. In addition, in various embodiments, a "business," "potential client," "user," "small business," "user's business," "given user," and "given business" can be, but is not limited to, a person, a commercial entity, an application, a service, or a computing system.

As used herein the term "specialist" and "available specialist" include parties and professionals having knowledge or expertise in a domain, an activity, or field of endeavor, such as accounting. In various embodiments, a specialist is able to provide special assistance to a user.

As used herein, the terms "specialist" and "specialists" are used to denote parties whose data is obtained and used as offline training data to train one or more models in an offline environment. In contrast, as used herein the terms "available specialist" and "available specialists" are used to denote parties that are available to provide at least one special service to potential clients and whose data is analyzed by the disclosed method and system for matching specialists and potential clients in an online runtime/execution environment and, in one embodiment, is used as online training data to train/modify one or more models in an online environment.

As used herein, the term "user experience" includes not only the data entry process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

Herein the term "Artificial Intelligence (AI)" includes any method, process, system, or mechanism through which a machine interacts with the world around it, mimics human behavior, or perform tasks as if it were human, using software and/or hardware components.

Herein the term "Machine Learning (ML)" includes any form of AI that relies on "learning" and uses one or more algorithms to analyze data, recognize patterns among the data, and make predictions without requiring a person to program specific instructions into software.

Herein, the term "model" includes any system, module, or function that is trained using machine learning or other artificial intelligence methods, as discussed herein, and/or as known in the art at the time of filing, and/or as developed after the time of filing.

Herein, the term "engine" includes any system, module, or process that drives a function such as identification, extraction, mapping, correlation, or any other operation that does not necessarily, but can, require machine learning methods. In some instances, the terms "model" and "engine" are interchangeable.

Overview

In one embodiment, a method and system for matching specialists and potential clients includes two phases, an offline training phase implemented in a training environment and an online execution phase implemented in an online runtime/execution environment.

In one embodiment, in an offline training environment, potential client model training data associated with two or more potential clients, and in various embodiments, hundreds, thousands, tens of thousands, hundreds of thousands, millions, tens of millions, or even hundreds of millions or more potential clients is obtained and processed to identify and extract potential client attribute model training data representing one or more potential client attributes for each potential client represented in the potential client model training data.

In one embodiment, in the offline training environment, specialist model training data associated with one or more specialists, and in various embodiments, hundreds, thousands, tens of thousands, hundreds of thousands, millions, tens of millions, or even hundreds of millions or more specialists is obtained and processed to identify and extract specialist attribute model training data representing one or more specialist attributes for each specialist represented in the specialist model training data.

In one embodiment, in the offline training environment, potential client satisfaction data representing a level of satisfaction of each potential client represented in the potential client model training data with specialists represented in the specialist model training data associated with that potential client is identified, generated, or otherwise obtained.

In one embodiment, the potential client satisfaction data is obtained by providing users of the data management system access to a listing of recommended specialists. The users' responses to the listing of recommended specialists is then monitored and recorded for use as potential client satisfaction data. In various embodiments, the users' responses include, but are not limited to: viewing of a specialist's profile, clicking on a link associated with the specialist, or viewing a website associated with the specialist; submission of a lead or inquiry to a specialist, such as sending an email, text message, or making a phone call to the specialist; and any other communications or connections with specialists indicating past and present connections between the user and the specialist.

In one embodiment, in the offline training environment, the potential client attribute model training data, the specialist attribute model training data, and the potential client satisfaction data are provided as training data for a potential client-specialist matching model to train the potential client-specialist matching model.

In one embodiment, once the potential client-specialist matching model is trained, the method and system for matching specialists and potential clients is executed in an online runtime environment.

In one embodiment, the method and system for matching specialists and potential clients is executed on a given user's, i.e., potential client's, data associated with a given user that is processed to identify and extract user's potential client attribute data representing one or more potential client attributes for the user.

In one embodiment, access to available specialist data associated with one or more currently available specialists is obtained and processed to identify and extract available specialist attribute data for each available specialist represented in the available specialist data.

In one embodiment, the user's, i.e., the given potential client's, potential client attribute data and the available specialist attribute data for each available specialist represented in the available specialist data is provided to the potential client-specialist matching model. In one embodiment, the potential client-specialist matching model generates a good match probability score for each user and available specialist pair. In one embodiment, based, at least in part, on the generated good match probability scores for each user and available specialist pair, specialist recommendation data is generated indicating available specialists recommended for the user.

In one embodiment, the recommended available specialists for a given user are identified based on a comparison of the good match probability scores for each user and available specialist pair with a threshold good match probability score. In one embodiment, an available specialist with the highest good match probability score for a given user is identified as the recommended available specialist. In one embodiment, a defined number of available specialists with the highest good match probability scores for the user are identified as recommended specialists.

In one embodiment, the specialist recommendation data is then provided to the user. In one embodiment, the user is also provided contact data, or a communication channel, for each recommended available specialist included in the specialist recommendation data.

As noted above, finding the right specialist is particularly critical when the potential client is a small business. Consequently, in accordance with one embodiment, access to raw business data associated with two or more business users of one or more data management systems is obtained.

In one embodiment, the raw business data is obtained from the one or more data management systems and/or any other source of business data, as discussed herein, or as available or known at the time of filing, or as made available or known after the time of filing.

In one embodiment, the raw business data is formatted or otherwise processed to transform the raw business data into business model training data. In one embodiment, the business model training data includes one or more of business operational model training data, business transactional model training data, business clickstream model training data, business organizational and tax model training data, business employment model training data, business historical specialist usage model training data, and business historical specialist satisfaction data, or any other business model training data, as discussed herein, or as available or known at the time of filing, or as made available or known after the time of filing.

In one embodiment, the business model training data is processed to identify and extract business attribute model training data representing one or more business attributes for each business represented in the business model training data.

In one embodiment, access to raw specialist data associated with one or more specialists is obtained. In one embodiment, the raw specialist data is formatted or otherwise processed to transform the raw specialist data into specialist model training data including one or more of specialist personal model training data, specialist demographic model training data, specialist specialty model training data, specialist education model training data, specialist employment model training data, specialist experience model training data, specialist certification model training data, and specialist client model training data, or any other specialist model training data as discussed herein, or as available or known at the time of filing, or as made available or known after the time of filing.

In one embodiment, the specialist model training data is processed to identify and extract specialist attribute model training data representing one or more specialist attributes for each specialist represented in the specialist model training data.

In one embodiment, the business model training data, the specialist model training data, the business attribute model training data, and the specialist attribute model training data is processed to identify matched business and specialist pairs representing associated businesses and specialists represented in the business model training data and specialist model training data.

In one embodiment, the business model training data associated with the matched business of each matched business and specialist pair is processed to identify a level of satisfaction of the matched business with the matched specialist.

In one embodiment, business satisfaction data representing the level of satisfaction of the matched business with the matched specialist for each matched business and specialist pair is generated.

In one embodiment, the business attribute training data, the specialist attribute training data, and the business satisfaction data associated with each matched business and specialist pair is correlated and correlated business-specialist-satisfaction attribute model training data representing the correlated business attribute training data, the specialist attribute training data, and the business satisfaction data associated with each matched business and specialist pair is generated.

In one embodiment, the correlated business-specialist-satisfaction attribute model training data is provided to a business-specialist matching model where the correlated business-specialist-satisfaction attribute model training data is used to train the business-specialist matching model.

In various embodiments, the business-specialist matching model is one or more of, a supervised machine learning trained model, an unsupervised machine learning trained model, a semi-supervised machine learning trained model, or any machine learning trained model, as discussed herein, or as available or known at the time of filing, or as made available or known after the time of filing.

In various embodiments, the business-specialist matching model is one or more of, a random forest model, a multiclass Support Vector Machine (SVM) and decision tree model, a logistic regression model, or any machine learning-based model, as discussed herein, or as available or known at the time of filing, or as made available or known after the time of filing.

In one embodiment, once the model training data is correlated by the business-specialist-satisfaction correlation engine, and the business-specialist matching model is trained using the correlated model training data, the method and system for matching specialists and potential clients is ready to be executed using user's business data associated with a given user's business and available specialist data To this end, in one embodiment, access to user's business data associated with a given user's business is obtained. In one embodiment, the user's business data is obtained for the one or more data management systems, such as a small business management system, or any source of user's business data as discussed herein, or as available or known at the time of filing, or as made available or known after the time of filing.

In one embodiment, the user's business data includes one or more of, the user's business operational data, the user's business transactional data, the user's business clickstream data, the user's business organizational and tax data, and the user's business employment data, or any business data as discussed herein, or as available or known at the time of filing, or as made available or known after the time of filing. In one embodiment, the user's business data is processed to identify and extract user's business attribute data representing one or more business attributes for the user's business.

In one embodiment, access to available specialist data associated with one or more currently available specialists is obtained. In one embodiment, the available specialist data is obtained from one or more of, professional directories, ratings systems, professional and social media sources, one or more databases, one or more certification agencies or data management system provider databases, or any other source of available specialist data as discussed herein, or as available or known at the time of filing, or as made available or known after the time of filing.

In one embodiment, the available specialist data includes one or more of available specialist personal data, available specialist demographic data, available specialist specialty data, available specialist education data, available specialist employment data, available specialist experience data, available specialist certification data, and available specialist client data, or any other available specialist data as discussed herein, or as available or known at the time of filing, or as made available or known after the time of filing.

In one embodiment, the available specialist data is processed to identify and extract available specialist attribute data for available specialists represented in the available specialist data.

In one embodiment, the user's business attribute data and the available specialist attribute data is provided to the business-specialist matching model. In one embodiment, the business-specialist matching model generates a good match probability score for each user business and available specialist pair. In one embodiment, based, at least in part, on the generated good match probability scores for each user business and available specialist pair, specialist recommendation data is generated indicating available specialists recommended for the user's business.

In one embodiment, the recommended available specialists for a given user's business are identified based on a comparison of the good match probability scores for each user's business and available specialist pair with a threshold good match probability score. In one embodiment, an available specialist with the highest good match probability score for a given user's business is identified as the recommended available specialist. In one embodiment, a defined number of available specialists with the highest good match probability scores for the user's business are identified as recommended specialists.

In one embodiment, specialist recommendation data indicating available specialists recommended for the user's business is generated. In one embodiment, the specialist recommendation data is provided to the user, the user's business, or one or more user computing systems accessible by the user or the user's business.

In one embodiment, the specialist recommendation data includes a listing of multiple recommended specialists. In one embodiment, the specialist recommendation data includes a listing of multiple recommended specialists along with portions of their associated specialist data and why the specialist is being recommended. In one embodiment, the specialist recommendation data includes a probability score or display indicating the calculated probability the specialists listed are a good match for the user.

In one embodiment, user's business specialist satisfaction data associated with one or more available specialists included in the specialist recommendation data is obtained from one or more of the user, user's business, and a computing system associated with the user or the user's business. In one embodiment, the user's business specialist satisfaction data indicates the user's business' satisfaction with the one or more available specialists included in the specialist recommendation data.

In various embodiments, the user's business specialist satisfaction data includes the users' responses to the recommended specialists such as, but not limited to: viewing, or not viewing, a recommended specialist's profile, clicking, or not clicking, on a link associated with a recommended specialist, viewing, or not viewing, a website associated with a recommended specialist; submission of a lead or inquiry to a recommended specialist, such as sending an email, text message, or making a phone call to the specialist; and any other communications or connections with recommended specialists indicating connections between the user and the recommended specialist.

In one embodiment, once the user's business specialist satisfaction data associated with one or more available specialists included in the specialist recommendation data is obtained, the user's business specialist satisfaction data, the user's business attribute data, and at least part of the available specialist attribute data for the one or more available specialists included in the specialist recommendation data, are provided and used as online training data for the business-specialist matching model of the specialist recommendation module.

In one embodiment, the user's business specialist satisfaction data is used to modify the business-specialist matching model of the specialist recommendation module in an online environment.

The present disclosure provides highly efficient, effective, and versatile systems and methods for machine-learned matching of specialists to potential clients. However, the disclosed embodiments do not encompass, embody, or preclude other forms of innovation in the area of specialist and potential client matchmaking.

In addition, machine-learned matching of specialists to potential clients is a technical solution to a long-standing technical problem and is not an abstract idea for at least several reasons. First, machine-learned matching of specialists and potential clients is not an abstract idea because it is not merely an idea itself, e.g., machine-learned matching of specialists and potential clients cannot be performed mentally or using pen and paper. For example, it is not possible for the human mind to match, or even identify/recognize, all of the possible potential client attributes and all of the known specialist attributes, and relationships between the two, even with pen and paper to assist the human mind and even with unlimited time.

In contrast, the disclosed embodiments require the use of special training data, such as, but not limited to, business operational model training data, business transactional model training data, business clickstream model training data, business organizational and tax model training data, business employment model training data, business historical specialist usage model training data, and business historical specialist satisfaction data, for two or more, and, in various embodiments, millions, tens of millions, or hundreds of millions of, businesses obtained from one or more data sources, such as, but not limited to, one or more small business management systems, such as one or more small business inventory, accounting, or tax management systems.

In addition, the disclosed embodiments require the use of special training data, such as, but not limited to, specialist personal model training data, specialist demographic model training data, specialist specialty model training data, specialist education model training data, specialist employment model training data, specialist experience model training data, specialist certification model training data, and specialist client model training data, associated with two or more, and, in various embodiments, millions, tens of millions, or hundreds of millions of, specialists obtained from one or more data sources.

In addition, the disclosed embodiments include the use of machine learning methods to generate and train models, including but not limited to, a business-specialist matching model, along with various data processing algorithms and engines. Furthermore, some of the disclosed embodiments include creating special model training data sets, developing, applying, and dynamically modifying one or more analytics models using supervised, and/or unsupervised, and/or semi-supervised training processes, and the application of artificial intelligence and structured and/or unstructured user feedback; none of which can be performed mentally or with pen, paper, and unlimited time alone.

Second, machine-learned matching of specialists and potential clients is not an abstract idea because it is not a fundamental economic practice (e.g., is not merely creating a contractual relationship, hedging, mitigating a settlement risk, etc.). In contrast, the disclosed embodiments employ one or more machine learning processes and models to provide a technical solution to the long-standing technical problem of recommending a specialist to a potential client that is determined objectively and efficiently to be a good match for that potential client.

In addition, using the disclosed embodiments and machine-learned matching of specialists and potential clients, a better understanding can be achieved of the reasons why users established a relationship with a specialist. Such an understanding enables a more likely establishment of a successful future connection between users and specialists.

For example, using the disclosed embodiments, important and non-intuitive drivers can be identified between users and specialists to improve the understanding of quality connections between users and specialists. An improved understanding of such quality connections allows for a more durable relationship between a user and a specialist. In addition, by providing more accurate matching of specialists to potential clients using machine-learning models that provide recommendations tailored to the users, embodiments of the present disclosure allow for reduced use of processor cycles, memory, bandwidth, and power consumption associated with specialist matchmaking, compared to the unguided, ad hoc recommendations currently available. In addition, the disclosed embodiments, provide a solution to Internet and transaction processing problems currently associated with specialist and potential client matching services/methods. Consequently, computing and communication systems implementing or providing the embodiments of the present disclosure are transformed into more operationally efficient devices and systems.

Third, machine-learned matching of specialists and potential clients is not an abstract idea because it is not a method of organizing human activity (e.g., managing a game of bingo), but is rather, in one embodiment, a tool for enabling a user to assess the recommendations for specialists selected for the user based on machine learning models. In addition, using the disclosed embodiments, a service is provided that significantly improves the field of data management and, in particular, personal and business financial management by reducing the amount of time it takes for a user to connect with a specialist that is likely to be a successful relationship. For example, the selection of a specialist by a user may cause the user's business to improve and accordingly utilize additional services provided by a data management system. Therefore, both human and non-human resources are utilized more efficiently.

Fourth, although mathematics may be used in machine-learned matching of specialists and potential clients, the disclosed and claimed system and method of machine-learned matching of specialists and potential clients is not an abstract idea because the system and method is not simply a mathematical relationship/formula. In contrast, the disclosed embodiments provide for the matching of users to specialists based on obtaining model training data from multiple sources, using big data analysis, building machine learning models, and leveraging artificial intelligence. In addition, using the disclosed embodiments, a data management system is provided that increases loyalty to the data management system because a specialist that assists a user in improving the user's business causes an increase in the loyalty of the user to the data management system that records the transactions of the improved business. This results in repeat customers, efficient data and transaction management services, and reduced abandonment of use of the data management system, according to one embodiment.

Exemplary Environments

As noted above, in one embodiment, the method and system for matching specialists and potential clients includes two phases, an offline training phase implemented in a training environment and an online execution phase implemented in an online runtime/execution environment.

As also noted above, matching a potential client to a specialist is particularly critical in cases where the potential client is a small business. Consequently, the specific illustrative examples of FIGS. 1, 2, 3A, 3B, 4, 5A, 5B, and 6 discussed below are directed to embodiments where the potential client is a small business. However, those of skill in the art will readily recognize the inventive concepts disclosed herein are equally applicable to other types of potential clients and specialists. Therefore, the specific examples discussed herein should not be read to limit the scope of claims as set forth below.

Figure 2:
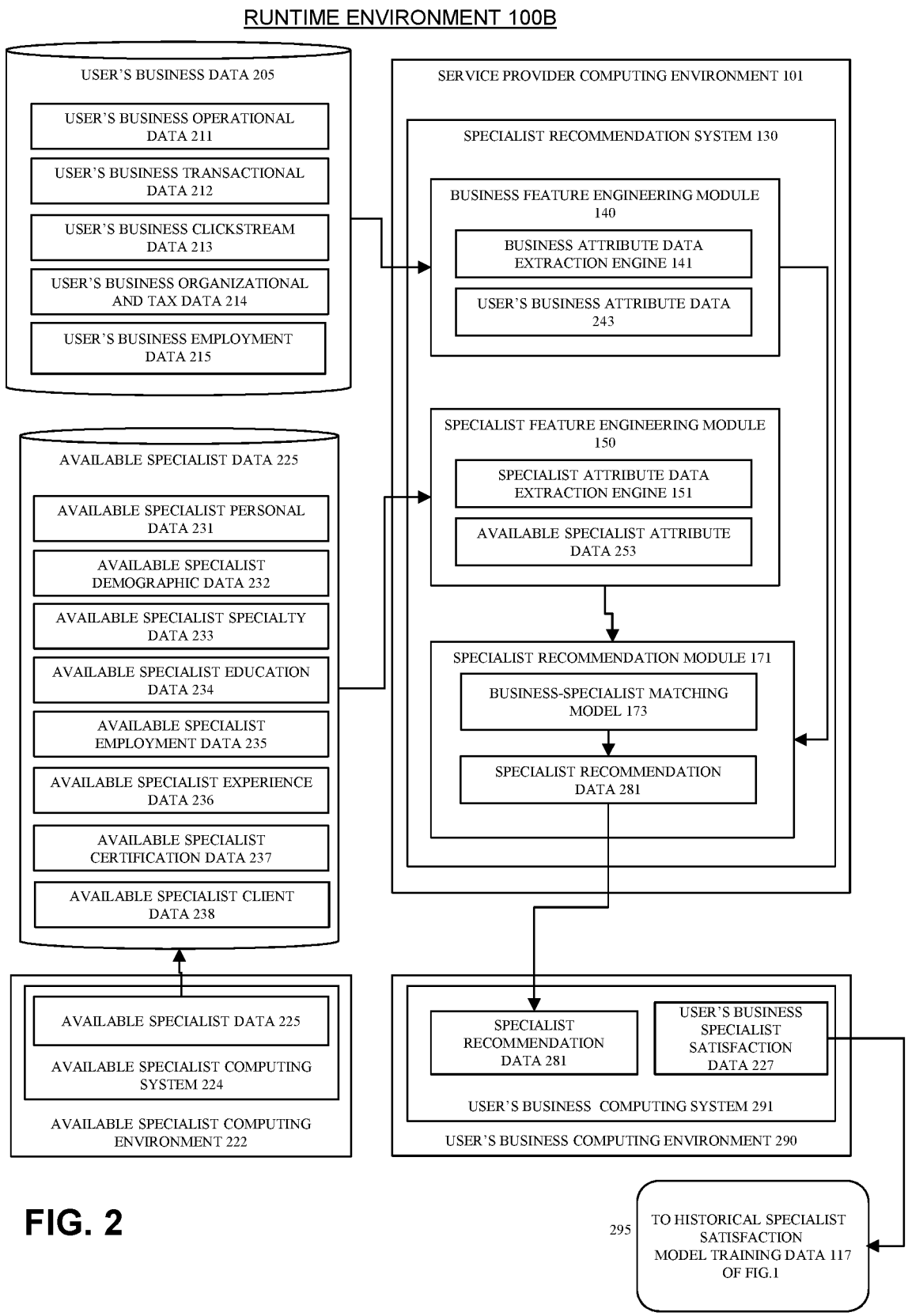
FIG. 2 is a functional block diagram of a runtime environment for implementing runtime execution of a method and system for matching specialists and potential clients in accordance with one embodiment where the potential client is a small business.

FIGS. 1 and 2 are exemplary representations of a training environment 100A and a runtime environment 100B for implementing a method and system for matching specialists and potential clients, for the specific illustrative instance where the potential client is a small business, in accordance with one embodiment. FIGS. 1 and 2 include some common features and elements as indicated by common reference numerals used in both FIG.s. However, FIG. 1 is a functional block diagram of a training environment 100A for implementing offline model training of modules and models implementing a method and system for matching specialists and potential clients, in accordance with one embodiment. On the other hand, FIG. 2 is a functional block diagram of a runtime environment 100B for implementing runtime/online execution and runtime/online training of a method and system for matching specialists and potential clients, in accordance with one embodiment.

Referring to FIG. 1 and FIG. 2 together, in one embodiment, the training environment 100A of FIG. 1 and the runtime environment 100B of FIG. 2 both include a service provider computing environment 101, which includes a specialist recommendation system 130, shown as implemented in the service provider computing environment 101.

Referring to FIG. 1, in one embodiment, the training environment 100A includes: a business feature engineering module 140, including a business attribute data extraction engine 141; a specialist feature engineering module 150, including a specialist attribute data extraction engine 151; a model training data correlation module 160, including a business-specialist-satisfaction correlation engine 161; and a specialist recommendation module 171, including a business-specialist matching model 173.

Since, in this specific illustrative example, FIG. 1 is a functional block diagram of a training environment 100A for implementing offline model training, FIG. 1 includes business model training data 110 including operational model training data 111, transactional model training data 112, clickstream model training data 113, organizational and tax model training data 114, employment model training data 115, historical specialist usage model training data 116, and historical specialist satisfaction model training data 117.

FIG. 1 also includes specialist model training data 120 including personal model training data 121, demographic model training data 122, specialty model training data 123, education model training data 124, employment model training data 125, experience model training data 126, certification model training data 127, and client model training data 128.

In one embodiment, big data analysis methods are used to access and process multiple sources of business data and obtain raw business data (not shown) associated with two or more businesses. In one embodiment, big data analysis methods are used to access and process multiple sources of specialist data and obtain raw specialist data (not shown) associated with two or more specialists.

As noted above, herein, the terms "business" and "businesses" are used to denote parties whose data is obtained and used as offline training data to train one or more models in an offline environment. In contrast, herein the terms "user's business," and "given business" are used to denote a specific individual party whose data is analyzed by the disclosed method and system for matching specialists and potential clients in an online runtime/execution environment.

Similarly, herein, the terms "specialist" and "specialists" are used to denote parties whose data is obtained and used as offline training data to train one or more models in an offline environment. In contrast, herein the terms "available specialist" and "available specialists" are used to denote parties that are available to provide at least one special service to businesses and whose data is analyzed by the disclosed method and system for matching specialists and potential clients in an online runtime/execution environment.

In one embodiment, the raw business data includes, but is not limited to, one or more of, raw operational data (not shown), raw transactional data (not shown), raw clickstream data (not shown), raw organizational and tax data (not shown), raw employment data (not shown), raw historical specialist usage data (not shown), and raw historical specialist satisfaction data (not shown) associated with the two or more businesses.

In one embodiment, all the raw business data is sanitized to remove all data, such as Personal Identification Data (PID), that could be used to identify any individual user or business, directly or indirectly, access an individual business or business user's data or accounts, or otherwise reveal personal information about a specific user or business.

In one embodiment, all the raw specialist data is sanitized to remove all data, such as Personal Identification Data (PID), that could be used to unintentionally identify any individual specialist, directly or indirectly, provide unauthorized access an individual specialist's data or accounts, or otherwise unintentionally reveal personal information about a specific specialist.

In one embodiment, once access to the raw business data is obtained, the raw business data is parsed, analyzed, labeled, formatted, and/or otherwise processed, to transform the raw business data into business model training data 110, including, but into limited to, operational model training data 111, transactional model training data 112, clickstream model training data 113, organizational and tax model training data 114, employment model training data 115, historical specialist usage model training data 116, and historical specialist satisfaction model training data 117. As discussed below, in one embodiment, respective portions of the business model training data 110 are then used to train various models of operational modules used for implementing the disclosed methods and systems for matching specialists and potential clients.

In one embodiment, the operational model training data 111, the transactional model training data 112, the clickstream model training data 113, the organizational and tax model training data 114, the employment model training data 115, the historical specialist usage model training data 116, and the historical specialist satisfaction model training data 117 portions of the business model training data 110 are analyzed and processed to identify business attributes in the business model training data 110 and generate business attribute model training data 143 associated with each of the two or more businesses represented in the business model training data 110.

To this end, in one embodiment, the business feature engineering module 140 is provided access to the business model training data 110. In one embodiment, the business feature engineering module 140 includes the business attribute data extraction engine 141. In one embodiment, the business attribute data extraction engine 141 uses one or more processors and one or more data extraction algorithms to identify business attributes in the business model training data and generate business attribute model training data 143 associated with each of the two or more businesses represented in the business model training data 110.

In one embodiment, the business attribute data extraction engine 141 uses natural language processing (NLP) methods, or similar techniques, and/or one or more algorithms to identify business attributes in the business model training data 110 and generate the business attribute model training data 143.

In various embodiments; the business attribute model training data 143 includes, but is not limited to, business attributes indicating one or more of: business type; industry type; business locations; customer/client base; customer/client location; services offered for sale; products offered for sale; seasonality of sales; manufacturing equipment; inventory quantities; inventory movement; vendor base; vendor location; checks; deposits; credit card charges; customer payments; statement charges; credit memos; sales receipts; item receipts; discounts; sales tax payments; vendor bill payments; vendor credits; vendor invoices; payees; payee locations; historical transaction amounts; recurrence and/or frequency of transactions; withdrawals; lease payments; business credit card payments; expense transactions; revenue transactions; insurance payments; whether the businesses are debtors or savers; whether the businesses are borrowers and, if so, what type of borrowers; payments to a specialist and/or any other transactional data indicating the businesses' connection with a specialist; the businesses' activity within, and level of use of, one or more data management systems; what recommendations of specialists a business has viewed and the time businesses spent viewing recommendations; the businesses' connection or engagement with specialists and procurement of specialized services from the specialists; the businesses' types of activity and how they use one or more data management systems; the length of time the businesses' use one or more data management systems; the businesses' interaction with specialist recommendation data presented or displayed to the business, including clicking on an about/information button, clicking on a telephone icon, clicking on a messaging icon, spending time viewing specialist recommendation data; the business structure; the tax classification of the business; governmental entities, such as cities and states, assessing tax on the business; and personal income tax for owners of a business.

In various embodiments, the business attribute model training data 143 further includes, but is not limited to, business attribute model training data indicating one or more of: a company identifier that identifies the business across a plurality of data management systems; a transaction management system identifier that specifies which of a plurality of data management systems the business is associated; a subscription type that indicates the type of subscription that a business has with a data management system such as a basic subscription or a premier subscription; a channel that indicates how the business acquired a subscription with a data management system; a migrator type that indicates the migration of the business from one data management system to another data management system; a billing code that indicates how the business is billed for data management services; an industry type that indicates the type of industry of the business; a zip code that indicates the location of the user; a state and/or county that indicates the state and/or county of the business; a payroll attached indicator that indicates whether a payroll tool of the data management system is attached; a payroll attach indicator data that indicates a date that the payroll tool was attached to the data management system; a payroll cancelled identifier that indicates whether a payroll tool of the data management system was cancelled; a payment attached indicator that indicates that a payment tool was attached to the data management system; a payment attach date indicator that indicates a date that the payment tool was attached to the data management system; a payment cancelled indicator that indicates whether a payment tool of the data management system was cancelled; a payments product indicator that indicates the type of payments tool utilized by the business; a payments channel indicator that indicates the channel through which a payments tool was acquired by the business; a payments inactive identifier that indicates whether the business is not active in utilizing the payments tool; a financial strength rating, such as a Dunn and Bradstreet score, that indicates the financial strength of the business; a number of years in business indicator that indicates the number of years the business has been in operation.

In various embodiments, the business attribute model training data 143 further includes, but is not limited to, one or more of, business attribute data indicating: a search session indicator that indicates that the business has searched for a specialist; a profile indicator that indicates the profile of the business in relation to the data management system; a specialist identifier that indicates that a specialist has connected with a business; a company identifier that indicates a business identifier in relation to the transaction management system; a search rank that indicates a business's prior ranking preference of a specialist in a search; a specialist profile viewed indicator that indicates whether or not a specialist's profile was viewed by a business; a connected indication that indicates that a business has connected with a specialist; a search date and time that indicates the date and time that a business searched for a specialist; a connection date and time that indicates the date and time that a business connected with a specialist; a message date and time that indicates the date and time a business sent a message to a specialist; a social link click date and time that indicates the date and time that a business clicked on a specialist's social link; a phone number click date and time that indicates the date and time a user clicked on a phone number of a specialist to contact a specialist; a website click date and time that indicates the date and time a business clicked on a link to a specialist's website.

In various embodiments, the business attribute model training data 143 further includes, but is not limited to, one or more of business attribute model training data indicating: a last month payments received indictor that indicates the last month that a payment was received by a business; a last month invoice sent indicator that indicates the last month that an invoice was sent from a business; a number of transactions that indicates the number of business transactions such as invoices, sales receipts, and bills; a number of transactions trend that indicates the trend of the business's number of transactions; a number of customers that indicates the number of customers associated with the business; a number of customers trend that indicates the trend of the business's number of customers; a number of vendors that indicates the number of vendors associated with the business; a number of vendors trend that indicates the trend of the business's number of vendors; a number of employees that indicates the number of employees associated with the business; a number of employees trend that indicates the trend of the business's number of employees; a cash flow status that indicates the business's cash flow status such as accounts receivable trend and accounts payable trend; an inventory indication that indicates the inventory status of the user; a applications usage indication that indicates which data management system applications are utilized by a business; a self-help usage indication that indicates how a business has utilized self-help tools of a data management system; a support call indication that indicates the volume of calls that a business has made to support staff; and/or any other business attribute data indicating a grouping or status of the businesses as discussed herein, and/or as known in the art at the time of filing, and/or as developed after the time of filing.

As a specific illustrative example, FIG. 3A is a listing of a sample set of business, or user's business, attributes 300A, in accordance with one embodiment.

As seen in FIG. 1, the training environment 100A includes the specialist model training data 120. In one embodiment, specialist model training data 120 is obtained, at least in part, from, or through, one or more data management systems used by the providers of specialist services.

In one embodiment, once access to the specialist data is obtained, the specialist data is parsed, analyzed, labeled, formatted, and/or otherwise processed, to transform the specialist data, into specialist model training data 120, including, but into limited to, personal model training data 121, demographic model training data 122, specialty model training data 123, education model training data 124, employment model training data 125, experience model training data 126, certification model training data 127, and client model training data 128. As discussed below, in one embodiment, respective portions of the specialist model training data 120 are then used to train various models of operational modules used for implementing the disclosed methods and systems for matching specialists and potential clients.

In one embodiment, the personal model training data 121, the demographic model training data 122, the specialty model training data 123, the education model training data 124, the employment model training data 125, the experience model training data 126, the certification model training data 127, and the client model training data 128 portions of the specialist model training data 120 are analyzed and processed to identify specialist attributes in the specialist model training data 120 and generate specialist attribute model training data 153 associated with the two or more specialists represented in the specialist model training data 120.

To this end, in one embodiment, the specialist feature engineering module 150 is provided access to specialist model training data 120. In one embodiment, the specialist feature engineering module 150 includes the specialist attribute data extraction engine 151. In one embodiment, the specialist attribute data extraction engine 151 uses one or more processors and one or more data extraction algorithms to identify specialist attributes in the specialist model training data 120 and generate specialist attribute model training data 153 associated with each of the two or more specialists represented in the specialist model training data 120.

In one embodiment, the specialist attribute data extraction engine 151 uses natural language processing (NLP) methods, or similar techniques, and/or one or more algorithms to identify specialist attributes in the specialist model training data 120 and generate the specialist attribute model training data 153.

In various embodiments, the specialist attribute model training data 153 includes, but is not limited to, one or more of, specialist profile attribute data indicating: a specialist includes a headshot picture in their advertising profile; data generated by, or capable of being processed by, a facial recognition system; the specialist uses social media and includes data collected by social media sites, for example, data indicating hobbies and interests; age; location; income level; gender; race; ethnicity; marital status; employment status; nationality; political preference; specialist's self-disclosed data indicating the specialty of the specialist; social media use and data indicating the specialty of the specialist; a subspecialty of the specialist; a location where a specialty is practiced; the level of education of a specialist; the educational institution attended by a specialist; the date the specialist acquired an educational degree; employment history of a specialist; where a specialist worked; length of time a specialist was employed at a company; an experience level with a specialty; the number of years in practice with a specialty and/or subspecialty; certifications acquired from authorized organizations to issue certifications; a certain skillset designation for a data management system and/or components of a data management system; certain skillset designation for a financial and/or tax management system and/or components of a financial and/or tax management system; the type of client serviced by a specialist; and the number of clients serviced by a specialist.

In various embodiments, the specialist attribute model training data 153 further includes, but is not limited to, one or more of, specialist profile attribute data indicating: a specialist identifier that indicates an identifier of a specialist; a display profile identifier that indicates a profile of a specialist that is displayed to a business; a display profile strength indicator that indicates the profile strength of a specialist that is displayed to a business; a certification indication that indicates a specialist's certification with one or more applications of the data management system; a zip code that indicates the location of a specialist; a geocoding indication that indicates the location from which a specialist used an application such as a specialist's internet protocol (IP) address; a rural/suburb indicator that indicates the territory in which a specialist operates; a website indication that indicates the website of a specialist; a number of characters in about me indication that indicates how many characters a specialist has typed into an about description; a years in business indication that indicates the number of years a specialist has been in business; a services provided indication that indicates the number of services a specialist provides; a service type that indicates the types of services provided by a specialist; a number of industries served indication that indicates the number of industries that a specialist serves; an industry type that indicates the type of industries that a specialist serves; languages that indicates the languages spoken by a specialist; a social sites listed indication that indicates the listing of a specialist's social media sites; a professional designations indication that indicates the designations of a specialist such as accountant and bookkeeper; a number of applications expertise indication that indicates the number of applications that a specialist has expertise; an applications type expertise indication that indicates the types of applications that a specialist has expertise such as tax management applications and finance management applications; a profile picture indication that indicates whether a specialist has a profile picture; a specialist tenure indication that indicates how many years a specialist has held itself out as a specialist; a specialist reviews indication that indicates business reviews of a specialist; a number of specialist reviews indication that indicates the number of reviews of a specialist; an average specialist rating that indicates the average rating of reviews of a specialist; an average number of characters in a specialist review indication that indicates the average number of characters a business entered when typing a review of a specialist; a median number of characters in a specialist review indication that indicates the median number of characters a business entered when typing a review of a specialist; a total number of characters in specialist reviews indication that indicates the total number of characters all businesses have entered when typing reviews of a specialist; a specialist responsiveness indication that indicates the responsiveness of the specialist to business queries; an expertise indication that indicates the level of expertise of the specialist in the specialist's field; a value indication that indicates the relative cost that a specialist charges a business with a connection, such as a rating of one dollar sign for cheap and four dollar signs for expensive; a firmographics indication that indicates the firmographics of a specialist's organization; a specialist number of connections indication that indicates the number of connections a specialist has with users; a firm tenure indication that indicates the years that a specialist's firm has been in existence; a firm client indication that indicates the number of clients that a specialist's frim has; and/or any other specialist profile attributes, as discussed herein, and/or as known in the art at the time of filing, and/or as become known after the time of filing.

As a specific illustrative example, FIG. 3B is a listing of a sample set of specialist, or available specialist, attributes 300B, in accordance with one embodiment.

As seen in FIG. 1, the training environment 100A includes model training data correlation module 160 and business-specialist-satisfaction correlation engine 161. In one embodiment, the business-specialist-satisfaction correlation engine 161 of the model training data correlation module 160 correlates the specialist data represented in the specialist attribute model training data 153 to the respective business data represented in the business attribute model training data 143, where a business has had an historical connection and/or association with a specialist. In one embodiment, the business-specialist-satisfaction correlation engine 161 identifies matched business and specialist pairs representing associated businesses and specialists represented in the business model training data 110, the business attribute model training data 143, the specialist model training data 120, and the specialist attribute model training data 153.

In one embodiment, the business-specialist-satisfaction correlation engine 161 of the model training data correlation module 160 processes the business model training data 110 associated with the matched business of each matched business and specialist pair to identify a level of satisfaction of the matched business with the matched specialist. In one embodiment, a level of satisfaction is determined from the historical specialist satisfaction model training data 117 of the business model training data 110. In one embodiment, the business-specialist-satisfaction correlation engine 161 of the model training data correlation module 160 generates business satisfaction data that represents a level of satisfaction of the matched business with the matched specialist for each matched business and specialist pair.

In one embodiment, the business-specialist-satisfaction correlation engine 161 of the model training data correlation module 160 correlates the business attribute model training data 143, the specialist attribute model training data 153, and the generated business satisfaction data associated with each matched business and specialist pair. In one embodiment, the correlated data of the business attribute model training data 143, the specialist attribute model training data 153, and the generated business satisfaction data associated with each matched business and specialist pair is provided as the correlated business-specialist-satisfaction attribute model training data 147 for one or more offer/attribute matching models, such as the business-specialist matching model 173 of the specialist recommendation module 171.

In one embodiment, in an offline training environment, such as the training environment 100A of FIG. 1, the specialist recommendation module 171 uses the correlated business-specialist-satisfaction attribute model training data 147 to train one or more business-specialist matching models 173. Then, in one embodiment, in an online runtime/execution environment, the one or more business-specialist matching models 173 are used for matching available specialists to a specific given business, i.e., user.

In one embodiment, the correlated business-specialist-satisfaction attribute model training data 147 is processed and labeled for use as model training data for business-specialist matching model 173 of the specialist recommendation module 171. In one embodiment, the correlated business attribute model training data 143 and the correlated specialist attribute model training data 153 are used as input data to the business-specialist matching model 173 and the generated business satisfaction data associated with each matched business and specialist pair is used as label data to the business-specialist matching model 173.

In one embodiment, the correlated business-specialist-satisfaction attribute model training data 147 is used to generate and train one or more machine learning based business-specialist matching models 173 to correlate the various business attributes to specialist attributes, in one embodiment on a business attribute/specialist attribute pair basis.

In one embodiment, the business-specialist matching model 173 uses business attribute and specialist attribute pairs (not shown) as inputs and portions of one or more of the business model training data 110, such as the historical specialist satisfaction model training data 117, as labels to train a mapping model such as a logistic regression model. In various embodiments, the business-specialist matching model 173 is any other mapping model as discussed herein, and/or as known or available in the art at the time of filing, and/or as is developed or comes available after the time of filing.

In one embodiment, once the one or more business-specialist matching models 173 are trained using the correlated business-specialist-satisfaction attribute model training data 147 in the offline training environment 100A, as shown in FIG. 1, the method and system for matching specialists and potential clients is ready for execution in the online/runtime environment 100B of FIG. 2.

As noted above, FIGS. 1 and 2 include many common features as indicated by common reference numerals used in both FIG.s. However, while FIG. 1 is a functional block diagram of a training environment 100A for implementing offline model training of a method and system for matching specialists and potential clients, in accordance with one embodiment, FIG. 2 is a functional block diagram of a runtime environment 100B for implementing runtime execution of a method and system for matching specialists and potential clients, in accordance with one embodiment.

Referring to FIG. 2, in one embodiment, the runtime environment 100B includes the service provider computing environment 101 including the specialist recommendation system 130. In one embodiment, the runtime environment 100B includes the user's business data 205, including, but not limited to, the user's business operational data 211, the user's business transactional data 212, the user's business clickstream data 213, the user's business organizational and tax data 214, and the user's business employment data 215. In one embodiment, the runtime environment 100B includes the available specialist data 225, including, but not limited to, the available specialist personal data 231, the available specialist demographic data 232, the available specialist specialty data 233, the available specialist education data 234, the available specialist employment data 235, the available specialist experience data 236, the available specialist certification data 237, and the available specialist client data 238. In one embodiment, the runtime environment 100B includes the available specialist computing environment 222, including the available specialist computing system 224 for providing the available specialist data 225. In one embodiment, the runtime environment 100B includes the user's business computing environment 290, including the user's business computing system 291 for receiving specialist recommendation data 281 and providing user's business specialist satisfaction data 227.

Although not shown in FIG. 2, in one embodiment, the runtime environment 100B includes the business model training data 110 of FIG. 1, including the historical specialist satisfaction model training data 117, to which is added the user's business specialist satisfaction data 227 as discussed below and as illustrated in FIG. 2 with block 295, i.e., the "to the historical specialist satisfaction model training data 117 of FIG. 1" block 295.

Referring to FIG. 2, in one embodiment, once the various modules and models are generated and trained using the respective portion of the business model training data 110 and the specialist model training data 120 as discussed above with respect to FIG. 1, the runtime model is executed for a specific, i.e., a given, business, also referred to herein as a user's business and/or a potential client, in the runtime environment 100B of FIG. 2. In one embodiment, the given business is matched in the runtime environment 100B of FIG. 2 with an available specialist from a plurality of available specialists.

In one embodiment, runtime execution of the method and system for matching specialists to potential clients is performed using a given user's business data 205. To this end, in one embodiment, the user's business data 205 representing data associated with the specific given business is obtained from one or more sources of the user's business data 205. In one embodiment, the user's business data 205 includes, but is not limited to, one or more of the user's business operational data 211, the user's business transactional data 212, the user's business clickstream data 213, the user's business organizational and tax data 214, the user's business employment data 215, and/or any other user's business data as discussed herein, and/or as known in the art at the time of filing, and/or as become known after the time of filing.

In one embodiment, the user's business data 205 is obtained from any one or more of the sources of operational data, transactional data, clickstream data, organizational and tax data, and employment data associated with a business such as, but not limited to, one or more data management systems associated with the business, live data feeds from clickstream or other interactive data sources, or any one or more other sources of business data as discussed herein, and/or as known or available in the art at the time of filing, and/or as becomes known or available after the time of filing.

In one embodiment, the user's business operational data 211 includes, but is not limited to, any operational data indicating business operations as discussed herein, and/or as known in the art at the time of filing, and/or as developed after the time of filing.

In one embodiment, the user's business transactional data 212 includes, but is not limited to, any data indicating business transactions as discussed herein, and/or as known in the art at the time of filing, and/or as developed after the time of filing.

In one embodiment, the user's business clickstream data 213 includes, but is not limited to, any clickstream data indicating the business' engagement with computers, applications, websites, the Internet, or any other networking, communications, or data access, technology as discussed herein, and/or as known in the art at the time of filing, and/or as developed after the time of filing.

In one embodiment, the user's business organizational and tax data 214 includes, but is not limited to, any organizational and tax data indicating a grouping or status of the businesses as discussed herein, and/or as known in the art at the time of filing, and/or as developed after the time of filing.

In one embodiment, the user's business employment data 215 includes, but is not limited to, any employment data indicating a grouping or status of the business as discussed herein, and/or as known in the art at the time of filing, and/or as developed after the time of filing.

In one embodiment, all the user's business data 205 is sanitized to remove all data, such as Personal Identification Data (PID), that could be used to identify any individual user, directly or indirectly, access an individual user's data or accounts, or otherwise reveal personal information about a specific user.

In one embodiment, the user's business data 205 is parsed, analyzed, labeled, formatted, and/or otherwise processed to put the data in a standard processing format.

In one embodiment, the runtime environment 100B and the specialist recommendation system 130 include the business feature engineering module 140. In one embodiment, the user's business operational data 211, the user's business transactional data 212, the user's business clickstream data 213, the user's business organizational and tax data 214, and the user's business employment data 215 are used by the business attribute data extraction engine 141 of the business feature engineering module 140 at the execution of the business feature engineering module 140 to generate the user's business attribute data 243 for the user's business.

In one embodiment, the user's business attribute data 243 includes, but is not limited to, any business attributes as discussed herein, and/or as known in the art at the time of filing, and/or as developed after the time of filing.

As a specific illustrative example, FIG. 3A is a listing of a sample set of business, or user's business, attributes 300A, in accordance with one embodiment.

As seen in FIG. 2, the runtime environment 100B includes the available specialist data 225 including, but not limited to, the available specialist personal data 231, the available specialist demographic data 232, the available specialist specialty data 233, the available specialist education data 234, the available specialist employment data 235, the available specialist experience data 236, the available specialist certification data 237, and the available specialist client data 238 that are obtained, at least in part, from, or through, specialists using the available specialist computing systems 224 of the available specialist computing environment 222.

In one embodiment, the available specialist personal data 231 includes, but is not limited to any personal data indicating a grouping or status of the specialists as discussed herein, and/or as known in the art at the time of filing, and/or as developed after the time of filing.

In one embodiment, the available specialist demographic data 232 includes, but is not limited to, any demographic data indicating/allowing for a demographic grouping or status of the specialists as discussed herein, and/or as known in the art at the time of filing, and/or as developed after the time of filing.

In one embodiment, the available specialist specialty data 233 includes, but is not limited to, any specialty data indicating a specialty-based grouping or status of the specialists as discussed herein, and/or as known in the art at the time of filing, and/or as developed after the time of filing.

In one embodiment, the available specialist education data 234 includes, but is not limited to, any education data indicating/providing for an education-based grouping or status of the specialists as discussed herein, and/or as known in the art at the time of filing, and/or as developed after the time of filing.

In one embodiment, the available specialist employment data 235 includes, but is not limited to, any employment data indicating/providing for an employment-based grouping or status of the specialists as discussed herein, and/or as known in the art at the time of filing, and/or as developed after the time of filing.

In one embodiment, the available specialist experience data 236 includes, but is not limited to, any experience data indicating/providing for an experienced-based grouping or status of the specialists as discussed herein, and/or as known in the art at the time of filing, and/or as developed after the time of filing.

In one embodiment, the available specialist certification data 237 includes, but is not limited to, any certification data indicating/providing for a certification-based grouping or status of the specialists as discussed herein, and/or as known in the art at the time of filing, and/or as developed after the time of filing.

In one embodiment, the available specialist client data 238 includes, but is not limited to, any client data indicating/providing for a client-based grouping or status of the specialists as discussed herein, and/or as known in the art at the time of filing, and/or as developed after the time of filing.

As noted above, in one embodiment, the available specialist data 225 includes a plurality of specialists that are available to provide specialty services to a business, such as, but not limited to bookkeeping services, accounting services, tax services, real estate services, procurement services, sales services, marketing services, information technology services, personnel services and/or any other specialty services, as discussed herein, and/or as known in the art at the time of filing, and/or as become known after the time of filing.

As seen in FIG. 2, the specialist recommendation system 130 incudes the specialist feature engineering module 150, including the specialist attribute data extraction engine 151. In one embodiment, the specialist attribute data extraction engine 151 is used to register and extract available specialist attribute data 253 from the available specialist data 225. To this end, in one embodiment, the available specialist data 225 is accessed by the specialist feature engineering module 150, including the specialist attribute data extraction engine 151. In one embodiment, the specialist attribute data extraction engine 151 uses one or more processors and/or one or more algorithms to identify and extract specialist attribute data, such as the available specialist attribute data 253, representing various available specialist attributes.

In one embodiment, the specialist attribute data extraction engine 151 uses natural language processing (NLP) methods, or similar techniques, and/or one or more algorithms to identify specialist attributes in the available specialist data 225 and extract available specialist attribute data 253.

In one embodiment, the available specialist attribute data 253 includes, but is not limited to, any specialist profile attributes, as discussed herein, and/or as known in the art at the time of filing, and/or as become known after the time of filing.

As a specific illustrative example, FIG. 3B is a listing of a sample set of specialist, or available specialist, attributes 300B, in accordance with one embodiment.

In one embodiment, all the available specialist data 225 is sanitized to remove all data, such as Personal Identification Data (PID), that could be used to unintentionally identify any individual specialist, directly or indirectly, provide unauthorized access an individual specialist's data or accounts, or otherwise unintentionally reveal personal information about a specific specialist.

As seen FIG. 2, the runtime environment 100B includes the specialist recommendation module 171 including the business-specialist matching model 173. In one embodiment, the user's business attribute data 243 and the available specialist attribute data 253 are provided as input data to the specialist recommendation module 171, including the one or more business-specialist matching models 173.

In one embodiment, the one or more business-specialist matching models 173 of the specialist recommendation module 171 use portions of the user's business operational data 211, the user's business transactional data 212, the user's business clickstream data 213, the user's business organizational and tax data 214, and the user's business employment data 215 as input data. In one embodiment, the one or more business-specialist matching models 173 of the specialist recommendation module 171 use portions of the available specialist personal data 231, the available specialist demographic data 232, the available specialist specialty data 233, the available specialist education data 234, the available specialist employment data 235, the available specialist experience data 236, the available specialist certification data 237, and the available specialist client data 238 as input data.

In one embodiment, the user's business attribute data 243 and the available specialist attribute data 253 are processed by the one or more business-specialist matching models 173 of the specialist recommendation module 171.

In one embodiment, the user's business attribute data 243 and the available specialist attribute data 253 are provided to the one or more business-specialist matching models 173 of the specialist recommendation module 171. In one embodiment, the user's business attribute data 243 and the available specialist attribute data 253 are processed by the one or more business-specialist matching models 173 of the specialist recommendation module 171.

In one embodiment, the one or more business-specialist matching models 173 of the specialist recommendation module 171 generate a good match probability score (not shown) for each user business and available specialist pair. In one embodiment, based, at least in part, on the generated good match probability scores (not shown) for each user business and available specialist pair, specialist recommendation data 281 is generated indicating available specialists recommended for the user's business.

In one embodiment, the recommended available specialists for a given user's business are identified based on a comparison of the good match probability scores (not shown) for each user's business and available specialist pair with a threshold good match probability score (not shown). In one embodiment, an available specialist with the highest good match probability score for a given user's business is identified as the recommended available specialist. In one embodiment, a defined number of available specialists with the highest good match probability scores for the user's business are identified as recommended specialists.

In one embodiment, the specialist recommendation data 281 indicating available specialists recommended for the user's business is generated and provided to the user by the specialist recommendation module 171. In one embodiment, the specialist recommendation module 171 provides the specialist recommendation data 281 to the user's business computing system 291 of the user's business computing environment 290.

In one embodiment, the specialist recommendation data 281 represents a listing of one or more specialists recommended to the business. In one embodiment, the recommended specialists of the specialist recommendation data 281 are listed and ranked according to the degree, and any weighting, of the user's business attribute and available specialist attribute matching, and/or other business and specialist indicated parameters. In one embodiment, the analysis parameters, features, assumptions, and/or processes used to perform the ranking is included in the specialist recommendation data 281. In one embodiment, the specialist recommendation data 281 includes a score or ranking indicating the likelihood of the business successfully connecting with the specialist and being satisfied with the specialty services provided by the specialist represented in the specialist recommendation data 281.

FIG. 4 is a diagram 400 of portions of illustrative specialist recommendation data provided via a data management system and displayed by the user's business computing system, in accordance with various embodiments.

Referring to FIGS. 1, 2, and 4 together, the generated recommendations of specialists are represented by the specialist recommendation user interface 410.

In one embodiment, the specialist recommendation user interface 410 includes, but is not limited to, a specialist number field 411 that displays an identifier of a specialist, a specialist name field 412 that displays the name of a specialist, a specialist description field 413 that displays a textual description of a specialist, and a specialist score field 414 that displays a score of the specialist that indicates the rank of a specialist in comparison to other specialists. In this specific example, the specialist recommendation user interface 410 includes, but is not limited to, five example specialists having specialist number fields 411 of "421," "422," "423," "424," and "425."

In one embodiment, the specialist recommendation user interface 410 includes the capability of a business user to connect with a specialist (not shown). For example, a business user may connect with a specialist by clicking on a link associated with a specialist. In one embodiment, a link represents a phone number that allows a business user to call the specialist. In one embodiment, a link represents an email address that allows a business user to send a message to a specialist. In one embodiment, a link represents a website address that displays a specialist's website. In one embodiment, a link represents a social media site that displays a social media page that is associated with a specialist. In various embodiment, a link may connect a business user to a specialist using any method or mechanism for connecting two parties as discussed herein, or as known in the art at the time of filing, or as developed, or becomes available, after the time of filing.

It is to be understood that the specialist recommendation user interface 410 may include fewer or more specialists than those illustrated in FIG. 4. In one embodiment, the specialist recommendation user interface 410 displays one specialist that is recommended to a business user. In one embodiment, the specialist recommendation user interface 410 displays a certain number of recommended specialists that are ranked, such as five specialists as illustrated in FIG. 4. In one embodiment, the specialist recommendation user interface 410 displays information about the ranking, such as an explanation of business and specialist attributes that were used to determine a score for a specialist recommendation. In one embodiment, the specialist recommendation user interface 410 provides for allowing a business user to change the ranking of the recommended specialists (not shown) based on the information provided by the specialist recommendation user interface 410.

Those of skill in the art will readily recognize that FIG. 4 is but one illustrative example of a means for providing specialist recommendations to a business and that numerous other examples, computing systems, displays, and embodiments are possible and contemplated. Consequently, the specific example shown in FIG. 4 should not be read to limit the scope of the claims as set forth below.

Returning to FIG. 2, in one embodiment, the specialist recommendation system 130 includes monitoring a given user's actions with respect to the recommended specialists of the specialist recommendation data 281. In one embodiment, the given user's actions with respect to the recommended specialists of the specialist recommendation data 281 is recorded and used to generate the user's business specialist satisfaction data 227.

In one embodiment, once the user's business specialist satisfaction data 227 is generated, the historical specialist satisfaction model training data 117 of FIG. 1 obtains the user's business specialist satisfaction data 227 and incorporates the user's business specialist satisfaction data 227 into the historical specialist satisfaction model training data 117.

In one embodiment, attribute data of the historical specialist satisfaction model training data 117 with the incorporated user's business specialist satisfaction data 227 is extracted by the business attribute data extraction engine 141 of the business feature engineering module 140 and stored as business attribute model training data 143 of FIG. 1. Accordingly, the user's business specialist satisfaction data 227 is used as future model training data for the one or more business-specialist matching models 173 of the specialist recommendation module 171.

Exemplary Processes

Embodiments of the present disclosure provide a technical solution to the technical problem in the potential client and small business community of identifying the specialist needs of a given potential client or small business and then connecting the potential client or small business with the right specialist for that potential client or small business.

In one embodiment, the technical solution includes using data management system data, such as small business management system data, for multiple potential clients/small businesses and specialist profile data for multiple specialists, to train one or more matching models in an offline training environment using machine learning techniques.

Figure 5A:
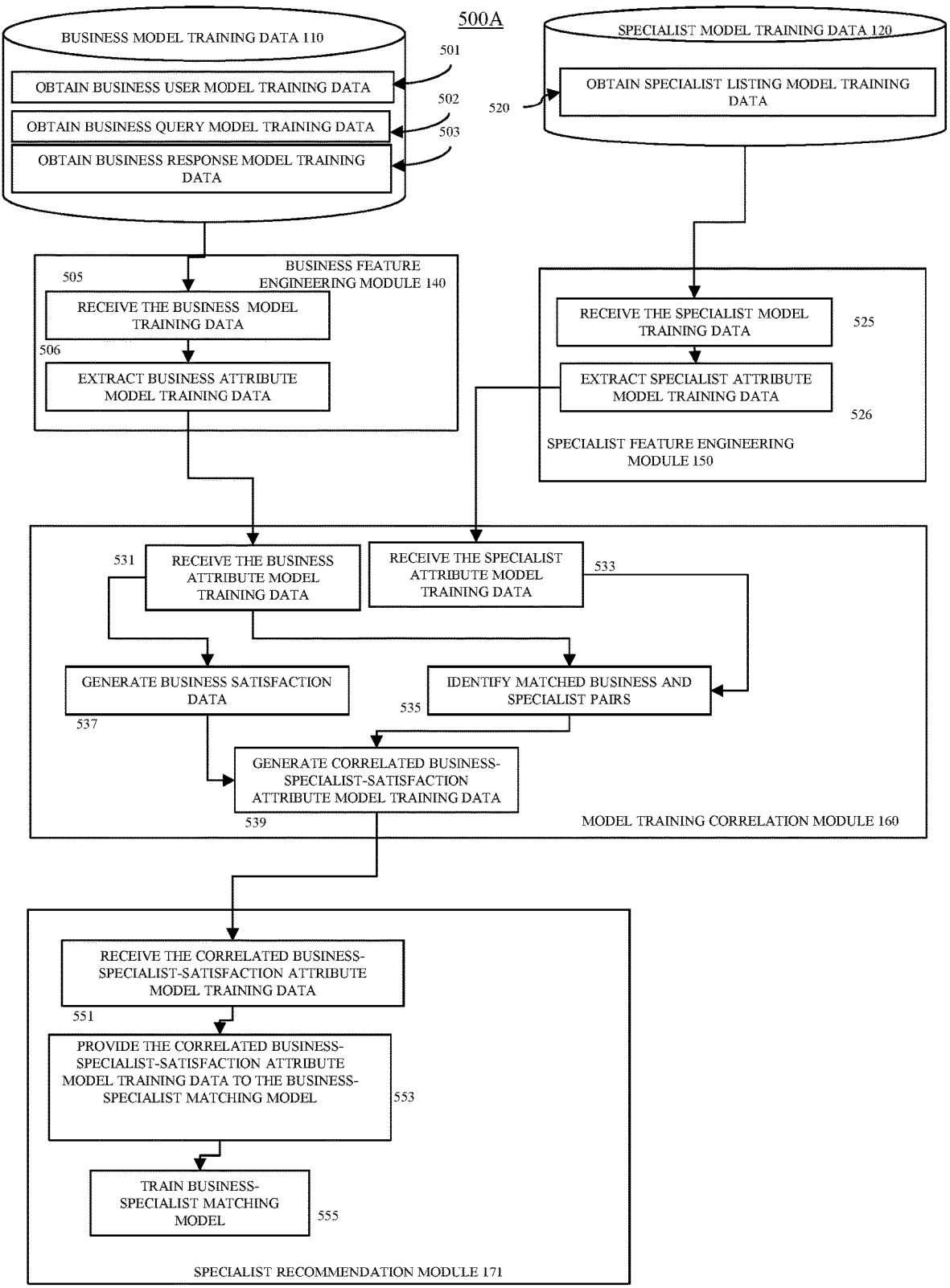
FIG. 5A is a hybrid functional and flow diagram of the offline training phase of one specific example of a method and system for matching specialists and potential clients, in accordance with one embodiment.

FIG. 5A is a hybrid functional and flow diagram 500A of the model training phase of one specific example of a method and system for matching specialists and potential clients, in accordance with one embodiment.

Referring to FIGS. 1, 2 and 5A together, in one embodiment, business model training data 110 is obtained. In one embodiment, business user model training data is obtained at 501. In one embodiment, the business user model training data is included in operational model training data 111 of FIG. 1. In this specific example, the business user model training data includes, but is not limited to, a user identifier, a query identifier, a search date designation, a location designation, a latitude/longitude designation, an in-product designation, an in-product identifier, an in-product authorization identifier, an out-product designation, a social media link designation, an email address designation, and any source of business user model training data as discussed herein, or as available or known at the time of filing, or as made available or known after the time of filing. In one embodiment, the business user model training data represents details of users who are performing a search for a specialist, such as an accountant. In one embodiment, such searching may be within a data management system or external to a data management system.

In one embodiment, business query model training data is obtained at 502. In one embodiment, the business query model training data is included in clickstream model training data 113 of FIG. 1. In this specific illustrative example, business query model training data includes, but is not limited to, a query identifier, a search identifier, a find an expert designation, a customer city/state search designation, a location designation, a distance near a location designation, a service provided designation, an industry served designation, a product supported designation, a sort by designation, a customer user written query designation, and any source of business query model training data as discussed herein, or as available or known after the time of filing, or as made available or known after the time of filing. In one embodiment, the business query model training data represents details on characteristics of a user's search for a specialist, such as an accountant.

In one embodiment, business response model training data is obtained at 503. In one embodiment, the business response model training data is included in the historical specialist satisfaction model training data 117 of FIG. 1. In this specific illustrative example, business query model training data includes, but is not limited to, a specialist and/or listing profile identifier of a specialist that has been viewed by a user; a specialist profile identifier of a specialist that has been submitted as a lead by a user; a specialist profile identifier of a specialist that a user has connected with; a quality of a match designation such as a review or value that indicates a specialist's responsiveness, expertise, helpfulness, and professionalism; and any source of business response model training data as discussed herein, or as available or known at the time of filing, or as made available or known after the time of filing. In one embodiment, the business response model training data represents details on characteristics of a user's views, leads, and connections with a specialist, such as an accountant.

In one embodiment, specialist model training data 120 is obtained. In one embodiment, specialist listing model training data is obtained at 520. In one embodiment, the specialist listing model training data is included in the personal model training data 121 of FIG. 1. In this specific illustrative example, specialist listing model training data includes, but is not limited to, a profile and/or listing identifier; an about me designation; a years in business designation; a number of partners designation; a product user designation; a certified expert designation; a services designation; an industries served designation; a languages designation; a social sites designation; a credentials designation; a software expertise designation; a name designation; a gender designation; a phone number designation; an address designation; an email designation; a free consultation offered designation; an image identifier; an image; a profile views designation; a leads/inquiries designation; a social link views designation; a member since designation; a professional description designation; a client description designation; a service description designation; a profile strength designation; a web site designation; a location/region/latitude/longitude designation; a preferred level designation; a social media sites designation; a client reviews designation; a number of reviews designation; a distribution of ratings designation; an average/median rating designation; a product identifier; an authorization identifier; and any source of specialist listing model training data as discussed herein, or as available or known at the time of filing, or as made available or known after the time of filing. In one embodiment, the specialist listing model training data represents details on specialists, such as accountants.

In one embodiment, at 505, the business model training data 110 is received by business feature engineering module 140. In one embodiment, at 506, the business model training data 110 is processed to identify and extract business attribute model training data 143 representing one or more business attributes for user, query and response data of each business in the business model training data 110.

In one embodiment, at 525, the specialist model training data 120 is received by specialist feature engineering module 150. In one embodiment, at 526, the specialist model training data 120 is processed to identify and extract specialist attribute model training data 153 for each specialist represented in the specialist model training data 120.

In one embodiment, at 531, the business attribute model training data 143 is received by model training correlation module 160 and, at 533, the specialist attribute model training data 153 is received by model training correlation module 160. In one embodiment, at 535, the business attribute model training data 143 and the specialist attribute model training data 153 is processed to identify matched business and specialist pairs representing associated businesses and specialists represented in the business attribute model training data 143 and the specialist attribute model training data 153. In one embodiment, at 537, the business model training data 110, including the business response model training data, that is associated with the matched business of each matched business and specialist pair is processed to identify a level of satisfaction of the matched business with the matched specialist. In one embodiment, business satisfaction data is generated at 537 that represents a level of satisfaction of the matched business of each matched business and specialist pair.

In one embodiment, at 539, the business attribute model training data, the specialist attribute model training data, and the business satisfaction data associated with each matched business and specialist pair is correlated. In one embodiment, correlated business-specialist-satisfaction attribute model training data 147 is generated at 539. In one embodiment, the correlated business-specialist-satisfaction attribute model training data 147 represents the correlation of business attribute model training data, specialist attribute model training data, and business satisfaction data associated with each matched business and specialist pair. In one embodiment, the correlation is represented by associations of a user identifier, a query identifier, a specialist identifier, and a response identifier.

In one embodiment, at 551, the correlated business-specialist-satisfaction attribute model training data 147 is received by specialist recommendation module 171. In one embodiment, at 553, the correlated business-specialist-satisfaction attribute model training data 147 is provided to the business-specialist matching model 173. In one embodiment, at 555, the business-specialist matching model 173 is trained using the correlated business-specialist-satisfaction attribute model training data 147.

In one embodiment, at 555, the business-specialist matching model 173 is trained to select a specialist, such as an accountant, from a set of candidate specialists, such as from the available specialist data 225. In one embodiment, the business-specialist matching model 173 uses a user's response to a specialist, such as the historical specialist satisfaction model training data 117, to rank the set of candidate specialists.

In one embodiment, business attributes are extracted from the business model training data 110 and the specialist model training data 120, including operational model training data 111 such as user features of user industry, user behavior, user history, and user demographics; clickstream model training data 113 such as user query features of user search filters and user settings; and personal model training data 121 such as specialist profile information, specialist behavior, specialist history, and specialist demographics. In one embodiment, each user and specialist are paired, and response features are captured, such as response features of whether or not an action was taken, whether or not a specialist was stored by a user to the user's favorites, and whether or not a specialist is submitted as a lead to being a candidate for a connection.

As an illustrative example, a user may be a small business that utilizes an online financial management system to financially manage the small business operations. The financial management system may retain information about the user and the user's account with the financial management system, such as user demographics and user behavior. The user may seek to find an accountant to help with the bookkeeping and payroll of the small business. The user may perform queries to find an accountant, such as by utilizing filtering options and performing custom queries. In this non-limiting example, a listing of recommended specialists is provided to the user based on the query, and the information of each specialist's profile and listing is stored. In this non-limiting example, the user's responses to the listing is stored, in which a response may be a view of a specialist, a submission of a lead to a specialist, and a connection with a specialist. In this non-limiting example, reviews by the user of the listed specialists are tracked based on past and present connections. In one embodiment, such responses form a basis for the business-specialist matching model learning how to balance a best match with a quality of a match. In one embodiment, relationships between users and specialist listings form a bipartite graph that is highly sparse. In one embodiment, each user, query, listing, and response has its own unique identifier.

In one embodiment, once the one or more matching models are trained in the offline environment, the one or more matching models are used in an online runtime/execution environment to process a given user's business data and available specialist data to identify one or more available specialists determined to be a good match for the business. In one embodiment, the user is then provided specialist recommendation data listing the matched available specialists and, in one embodiment, the user is provided one or more communication mechanisms for connecting with matched available specialists selected by the user.

Figure 5B:
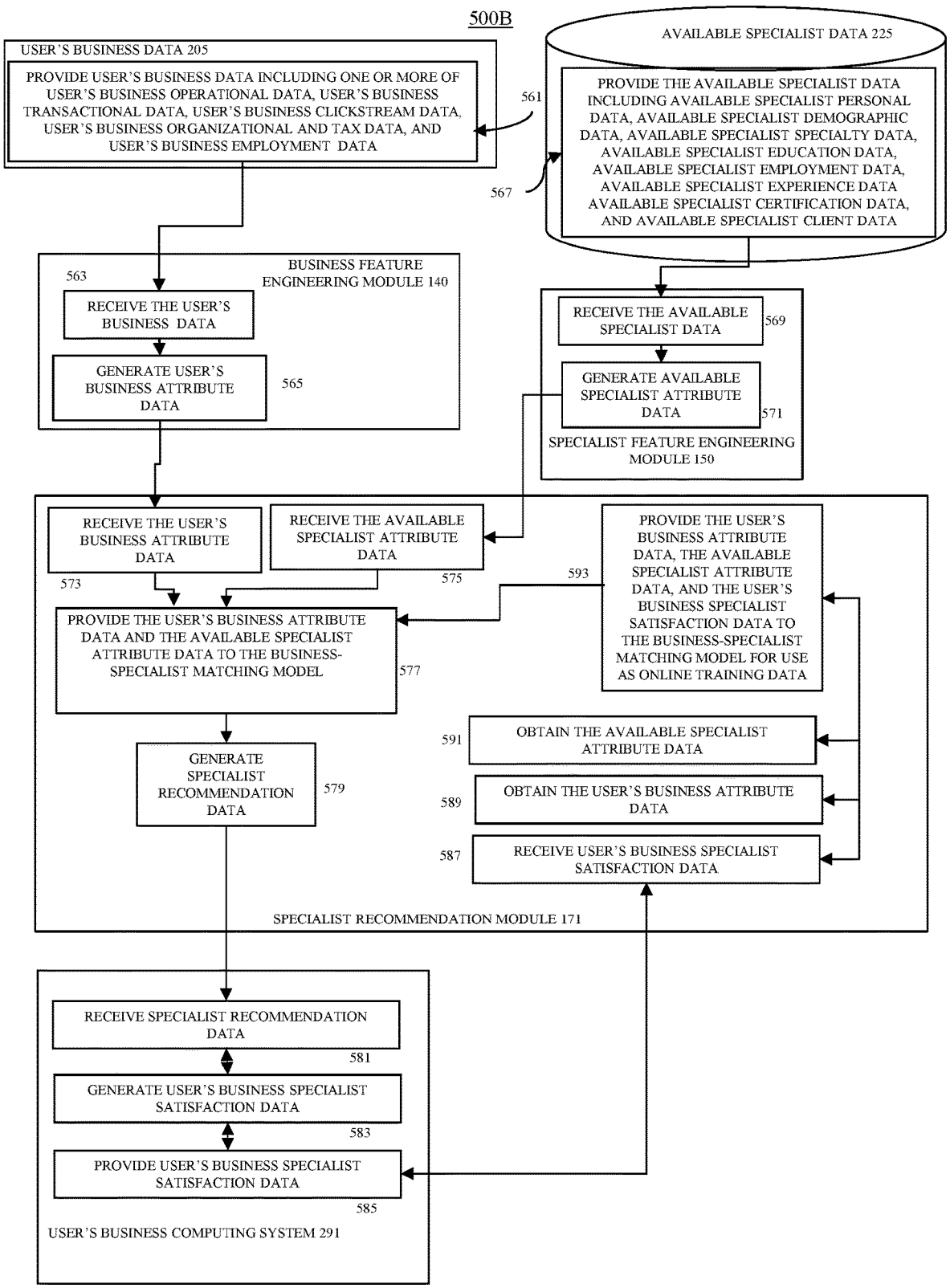
FIG. 5B is a hybrid functional and flow diagram of the online runtime execution phase of a specific example of a method and system for matching specialists and potential clients, in accordance with one embodiment.

FIG. 5B is a hybrid functional and flow diagram 500B of the online runtime execution of a specific example of a method and system for matching specialists and potential clients, in accordance with one embodiment.

Referring to FIGS. 1, 2, and 5B together, in one embodiment, user's business data 205, associated with a given user's business is provided at 561. In one embodiment, the user's business data 205 is obtained from the one or more data management systems, such as a small business management system, or any source of user's business data as discussed herein, or as available or known at the time of filing, or as made available or known after the time of filing.

In one embodiment, at 563 the user's business data 205 is received by business feature engineering module 140. In one embodiment, at 565, the user's business data 205 is processed to identify and extract user's business attribute data 243 representing one or more business attributes for the user's business.

In one embodiment, at 567, access to available specialist data 225 associated with one or more currently available specialists is provided. In one embodiment, the available specialist data 225 is obtained from one or more of, professional directories, ratings systems, professional and social media sources, one or more databases, one or more certification agency or data management system provider databases, or any other source of available specialist data as discussed herein, or as available or known at the time of filing, or as made available or known after the time of filing.

In one embodiment, at 569, the available specialist data 225 is received by specialist feature engineering module 150. In one embodiment, at 571, the available specialist data 225 is processed to identify, extract, and generate available specialist attribute data 253 for available specialists represented in the available specialist data 225.

In one embodiment, at 573, the user's business attribute data 243 is received by specialist recommendation module 171 and, at 575, the available specialist attribute data 253 for each available specialist represented in the available specialist data 225 is received by specialist recommendation module 171. In one embodiment, at 577, the user's business attribute data 243 and the available specialist attribute data 253 for each available specialist represented in the available specialist data 225 is provided to the business-specialist matching model 173.

In one embodiment, at 579, the business-specialist matching model 173 uses the user's business attribute data 243 and the available specialist attribute data 253 to generate specialist recommendation data 281 indicating available specialists recommended for the user's business using any of the methods discussed herein, known in the art at the time of filing, or as developed after the time of filing.

In one embodiment, at 581 the specialist recommendation data 281 is received by the user, the user's business, or one or more user's business computing systems 291 accessible by the user or the user's business.

In one embodiment, the specialist recommendation data 281 includes a listing of multiple recommended specialists. In one embodiment, the specialist recommendation data 281 includes a listing of multiple recommended specialists along with portions of their associated specialist data and why the specialist is being recommended. In one embodiment, the specialist recommendation data 281 includes a probability score or display indicating the calculated probability the specialists listed are a good match for the user.

In one embodiment, at 583, user's business specialist satisfaction data 227 associated with one or more available specialists included in the specialist recommendation data 281 is generated by the user. In one embodiment, at 585, the user's business specialist satisfaction data 227 is provided by one or more of the user, user's business, and user's business computing system 291 associated with the user or the user's business. In one embodiment, the user's business specialist satisfaction data 227 indicates the user's business' satisfaction with the one or more available specialists included in the specialist recommendation data 281.

In one embodiment, at 587, the user's business specialist satisfaction data 227 is received by the specialist recommendation module 171. In one embodiment, once the user's business specialist satisfaction data 227 associated with one or more available specialists included in the specialist recommendation data 281 is obtained at 587, at 589, the user's business attribute data 243 is obtained and, at 591, at least part of the available specialist attribute data 253 for the one or more available specialists included in the specialist recommendation data 281 is obtained.

In one embodiment, at 593, the user's business specialist satisfaction data 227, the user's business attribute data 243, and at least part of the available specialist attribute data 253 for the one or more available specialists included in the specialist recommendation data, are provided to the business-specialist matching model 173 of the specialist recommendation module 171 and used as online training data for the business-specialist matching model 173 to modify the business-specialist matching model 173 of the specialist recommendation module 171 in an online environment.

Figure 6:
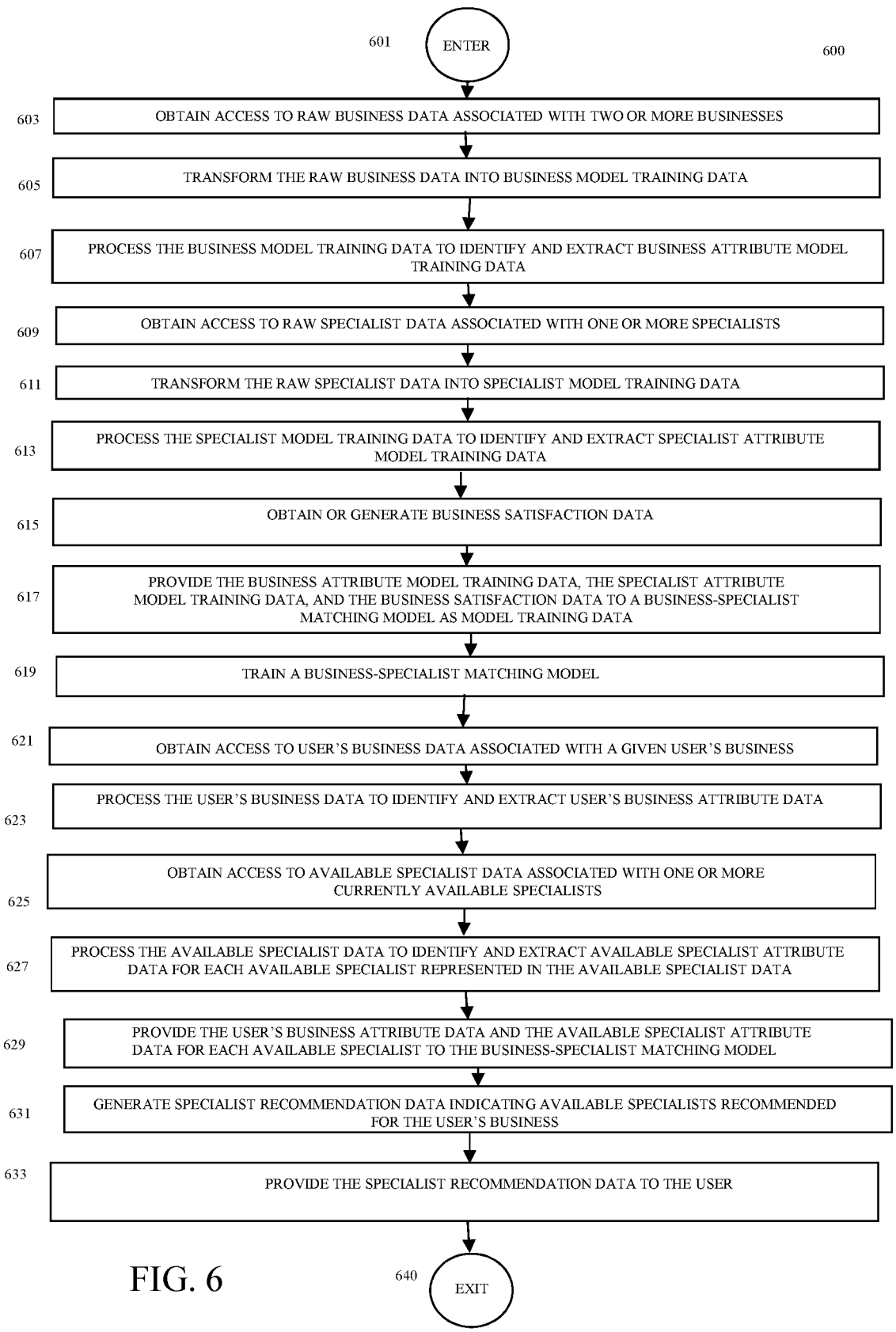
FIG. 6 is a flow diagram of a process for matching specialists and potential clients in accordance with one embodiment where the potential client is a small business.

FIG. 6 is a flow diagram of process 600 for matching specialists and potential clients in accordance with one embodiment where the potential client is a small business. As seen in FIG. 6, process 600 for matching specialists and potential clients begins at ENTER OPERATION 601 and proceeds to OBTAIN ACCESS TO RAW BUSINESS DATA ASSOCIATED WITH TWO OR MORE BUSINESSES OPERATION 603.

In accordance with one embodiment, at OBTAIN ACCESS TO RAW BUSINESS DATA ASSOCIATED WITH TWO OR MORE BUSINESSES OPERATION 603, access to raw business data associated with two or more business users of one or more data management systems is obtained.

In one embodiment, at OBTAIN ACCESS TO RAW BUSINESS DATA ASSOCIATED WITH TWO OR MORE BUSINESSES OPERATION 603, the raw business data is obtained from the one or more data management systems or any other source of business data, as discussed herein, or as available or known at the time of filing, or as made available or known after the time of filing.

In one embodiment, once access to raw business data associated with two or more business users of one or more data management systems is obtained at OBTAIN ACCESS TO RAW BUSINESS DATA ASSOCIATED WITH TWO OR MORE BUSINESSES OPERATION 603, process flow proceeds to TRANSFORM THE RAW BUSINESS DATA INTO BUSINESS MODEL TRAINING DATA OPERATION 605.

In one embodiment, at TRANSFORM THE RAW BUSINESS DATA INTO BUSINESS MODEL TRAINING DATA OPERATION 605, the raw business data of OBTAIN ACCESS TO RAW BUSINESS DATA ASSOCIATED WITH TWO OR MORE BUSINESSES OPERATION 603 is formatted or otherwise processed to transform the raw business data into business model training data.

In one embodiment, the business model training data of TRANSFORM THE RAW BUSINESS DATA INTO BUSINESS MODEL TRAINING DATA OPERATION 605 includes, but is not limited to, any business model training data, as discussed herein, or as available or known at the time of filing, or as made available or known after the time of filing.

In one embodiment, once the raw business data is formatted or otherwise processed to transform the raw business data into business model training data at TRANSFORM THE RAW BUSINESS DATA INTO BUSINESS MODEL TRAINING DATA OPERATION 605, process flow proceeds to PROCESS THE BUSINESS MODEL TRAINING DATA TO IDENTIFY AND EXTRACT BUSINESS ATTRIBUTE MODEL TRAINING DATA OPERATION 607.

In one embodiment, at PROCESS THE BUSINESS MODEL TRAINING DATA TO IDENTIFY AND EXTRACT BUSINESS ATTRIBUTE MODEL TRAINING DATA OPERATION 607 the business model training data of TRANSFORM THE RAW BUSINESS DATA INTO BUSINESS MODEL TRAINING DATA OPERATION 605 is processed to identify and extract business attribute model training data representing one or more business attributes for each business represented in the business model training data of TRANSFORM THE RAW BUSINESS DATA INTO BUSINESS MODEL TRAINING DATA OPERATION 605.

In various embodiments, the business attributes identified, extracted, and represented in the business attribute data of PROCESS THE BUSINESS MODEL TRAINING DATA TO IDENTIFY AND EXTRACT BUSINESS ATTRIBUTE MODEL TRAINING DATA OPERATION 607, include, but are not limited to, any one or more of the business attributes discussed herein above, or that are known in the art at the time of filing, or as become known after the time of filing.

In one embodiment, once the business model training data is processed to identify and extract business attribute model training data representing one or more business attributes for each business represented in the business model training data at PROCESS THE BUSINESS MODEL TRAINING DATA TO IDENTIFY AND EXTRACT BUSINESS ATTRIBUTE MODEL TRAINING DATA OPERATION 607, process flow proceeds to OBTAIN ACCESS TO RAW SPECIALIST DATA ASSOCIATED WITH ONE OR MORE SPECIALISTS OPERATION 609.

In one embodiment, at OBTAIN ACCESS TO RAW SPECIALIST DATA ASSOCIATED WITH ONE OR MORE SPECIALISTS OPERATION 609, access to raw specialist data associated with one or more specialists is obtained.

In one embodiment, once access to raw specialist data associated with one or more specialists is obtained at OBTAIN ACCESS TO RAW SPECIALIST DATA ASSOCIATED WITH ONE OR MORE SPECIALISTS OPERATION 609, process flow proceeds to TRANSFORM THE RAW SPECIALIST DATA INTO SPECIALIST MODEL TRAINING DATA OPERATION 611.

In one embodiment, at TRANSFORM THE RAW SPECIALIST DATA INTO SPECIALIST MODEL TRAINING DATA OPERATION 611, the raw specialist data of OBTAIN ACCESS TO RAW SPECIALIST DATA ASSOCIATED WITH ONE OR MORE SPECIALISTS OPERATION 609 is formatted or otherwise processed to transform the raw specialist data into specialist model training data.

In one embodiment, the specialist model training data of TRANSFORM THE RAW SPECIALIST DATA INTO SPECIALIST MODEL TRAINING DATA OPERATION 611 includes, but is not limited to, any specialist model training data as discussed herein, or as available or known at the time of filing, or as made available or known after the time of filing.

In one embodiment, once the raw specialist data is formatted or otherwise processed to transform the raw specialist data into specialist model training data and specialist attribute model training data at TRANSFORM THE RAW SPECIALIST DATA INTO SPECIALIST MODEL TRAINING DATA OPERATION 611, process flow proceeds to PROCESS THE SPECIALIST MODEL TRAINING DATA TO IDENTIFY AND EXTRACT SPECIALIST ATTRIBUTE MODEL TRAINING DATA OPERATION 613.

In one embodiment, at PROCESS THE SPECIALIST MODEL TRAINING DATA TO IDENTIFY AND EXTRACT SPECIALIST ATTRIBUTE MODEL TRAINING DATA OPERATION 613, the specialist model training data of TRANSFORM THE RAW SPECIALIST DATA INTO SPECIALIST MODEL TRAINING DATA OPERATION 611 is processed to identify and extract specialist attribute model training data representing one or more specialist attributes for each specialist represented in the specialist model training data of TRANSFORM THE RAW SPECIALIST DATA INTO SPECIALIST MODEL TRAINING DATA OPERATION 611.

In various embodiments, the specialist attributes identified, extracted, and represented in the specialist attribute data of PROCESS THE SPECIALIST MODEL TRAINING DATA TO IDENTIFY AND EXTRACT SPECIALIST ATTRIBUTE MODEL TRAINING DATA OPERATION 613, include, but are not limited to, any one or more of the specialist attributes discussed herein above, or that are known in the art at the time of filing, or as become known after the time of filing.

In one embodiment, once the specialist model training data is processed to identify and extract specialist attribute model training data representing one or more specialist attributes for each specialist represented in the specialist model training data at PROCESS THE SPECIALIST MODEL TRAINING DATA TO IDENTIFY AND EXTRACT SPECIALIST ATTRIBUTE MODEL TRAINING DATA OPERATION 613, process flow proceeds to OBTAIN OR GENERATE BUSINESS SATISFACTION DATA OPERATION 615.

In one embodiment, at OBTAIN OR GENERATE BUSINESS SATISFACTION DATA OPERATION 615, the business model training data of TRANSFORM THE RAW BUSINESS DATA INTO BUSINESS MODEL TRAINING DATA OPERATION 605 is processed to identify a level of satisfaction of the business with specialists used by, or otherwise associated with, the business for each of the businesses represented in the business model training data of TRANSFORM THE RAW BUSINESS DATA INTO BUSINESS MODEL TRAINING DATA OPERATION 605 and each specialist of the specialist model training data of TRANSFORM THE RAW SPECIALIST DATA INTO SPECIALIST MODEL TRAINING DATA OPERATION 611.

In one embodiment, at OBTAIN OR GENERATE BUSINESS SATISFACTION DATA OPERATION 615, the business model training data of TRANSFORM THE RAW BUSINESS DATA INTO BUSINESS MODEL TRAINING DATA OPERATION 605, the specialist model training data of TRANSFORM THE RAW SPECIALIST DATA INTO SPECIALIST MODEL TRAINING DATA OPERATION 611, the business attribute model training data of PROCESS THE BUSINESS MODEL TRAINING DATA TO IDENTIFY AND EXTRACT BUSINESS ATTRIBUTE MODEL TRAINING DATA OPERATION 607, and the specialist attribute model training data of PROCESS THE SPECIALIST MODEL TRAINING DATA TO IDENTIFY AND EXTRACT SPECIALIST ATTRIBUTE MODEL TRAINING DATA OPERATION 613 is processed to identify matched business and specialist pairs representing associated businesses and specialists represented in the business model training data and specialist model training data.

In one embodiment, at OBTAIN OR GENERATE BUSINESS SATISFACTION DATA OPERATION 615, the business model training data associated with the matched business of each matched business and specialist pair is processed to identify a level of satisfaction of the matched business with the matched specialist.

In one embodiment, at OBTAIN OR GENERATE BUSINESS SATISFACTION DATA OPERATION 615, business satisfaction data for each matched business and specialist pair is generated.

In one embodiment, once business satisfaction data representing the level of satisfaction of the matched business with the matched specialist for each matched business and specialist pair is generated at OBTAIN OR GENERATE BUSINESS SATISFACTION DATA OPERATION 615, process flow proceeds to PROVIDE THE BUSINESS ATTRIBUTE MODEL TRAINING DATA, THE SPECIALIST ATTRIBUTE MODEL TRAINING DATA, AND THE BUSINESS SATISFACTION DATA TO A BUSINESS-SPECIALIST MATCHING MODEL AS MODEL TRAINING DATA OPERATION 617.

In one embodiment, at PROVIDE THE BUSINESS ATTRIBUTE MODEL TRAINING DATA, THE SPECIALIST ATTRIBUTE MODEL TRAINING DATA, AND THE BUSINESS SATISFACTION DATA TO A BUSINESS-SPECIALIST MATCHING MODEL AS MODEL TRAINING DATA OPERATION 617, the business attribute training data of PROCESS THE BUSINESS MODEL TRAINING DATA TO IDENTIFY AND EXTRACT BUSINESS ATTRIBUTE MODEL TRAINING DATA OPERATION 607, the specialist attribute training data of PROCESS THE SPECIALIST MODEL TRAINING DATA TO IDENTIFY AND EXTRACT SPECIALIST ATTRIBUTE MODEL TRAINING DATA OPERATION 613, and the business satisfaction data of OBTAIN OR GENERATE BUSINESS SATISFACTION DATA OPERATION 615, associated with each matched business and specialist pair of OBTAIN OR GENERATE BUSINESS SATISFACTION DATA OPERATION 615 is correlated, and correlated business-specialist-satisfaction attribute model training data representing the correlation of the business attribute training data, the specialist attribute training data, and the business satisfaction data associated with each matched business and specialist pair is generated.

In one embodiment, at PROVIDE THE BUSINESS ATTRIBUTE MODEL TRAINING DATA, THE SPECIALIST ATTRIBUTE MODEL TRAINING DATA, AND THE BUSINESS SATISFACTION DATA TO A BUSINESS-SPECIALIST MATCHING MODEL AS MODEL TRAINING DATA OPERATION 617, the correlated business-specialist-satisfaction attribute model training data is provided to a business-specialist matching model.

In various embodiments, the business-specialist matching model of PROVIDE THE BUSINESS ATTRIBUTE MODEL TRAINING DATA, THE SPECIALIST ATTRIBUTE MODEL TRAINING DATA, AND THE BUSINESS SATISFACTION DATA TO A BUSINESS-SPECIALIST MATCHING MODEL AS MODEL TRAINING DATA OPERATION 617 is any machine learning trained model, as discussed herein, or as available or known at the time of filing, or as made available or known after the time of filing.

In one embodiment, once the correlated business-specialist-satisfaction attribute model training data is provided to a business-specialist matching model at PROVIDE THE BUSINESS ATTRIBUTE MODEL TRAINING DATA, THE SPECIALIST ATTRIBUTE MODEL TRAINING DATA, AND THE BUSINESS SATISFACTION DATA TO A BUSINESS-SPECIALIST MATCHING MODEL AS MODEL TRAINING DATA OPERATION 617, process flow proceeds to TRAIN A BUSINESS-SPECIALIST MATCHING MODEL OPERATION 619.

In one embodiment, at TRAIN A BUSINESS-SPECIALIST MATCHING MODEL OPERATION 619, the correlated business-specialist-satisfaction attribute model training data is used to train the business-specialist matching model of PROVIDE THE BUSINESS ATTRIBUTE MODEL TRAINING DATA, THE SPECIALIST ATTRIBUTE MODEL TRAINING DATA, AND THE BUSINESS SATISFACTION DATA TO A BUSINESS-SPECIALIST MATCHING MODEL AS MODEL TRAINING DATA OPERATION 617.

In one embodiment, once the business-specialist matching model is trained using the correlated business-specialist-satisfaction attribute model training data at TRAIN A BUSINESS-SPECIALIST MATCHING MODEL OPERATION 619, the process 600 for matching specialists and potential clients is ready to be executed using user's business data associated with a given user's business and available specialist data and process flow proceeds to OBTAIN ACCESS TO USER'S BUSINESS DATA ASSOCIATED WITH A GIVEN USER'S BUSINESS OPERATION 621.

In one embodiment, at OBTAIN ACCESS TO USER'S BUSINESS DATA ASSOCIATED WITH A GIVEN USER'S BUSINESS OPERATION 621, access to user's business data associated with a given user's business is obtained.

In one embodiment, at OBTAIN ACCESS TO USER'S BUSINESS DATA ASSOCIATED WITH A GIVEN USER'S BUSINESS OPERATION 621, the user's business data is obtained from the one or more data management systems, such as a small business management system, or any source of user's business data as discussed herein, or as available or known at the time of filing, or as made available or known after the time of filing.

In one embodiment, the user's business data of OBTAIN ACCESS TO USER'S BUSINESS DATA ASSOCIATED WITH A GIVEN USER'S BUSINESS OPERATION 621 includes any business data as discussed herein, or as available or known at the time of filing, or as made available or known after the time of filing.

In one embodiment, once access to user's business data associated with a given user's business is obtained at OBTAIN ACCESS TO USER'S BUSINESS DATA ASSOCIATED WITH A GIVEN USER'S BUSINESS OPERATION 621, process flow proceeds to PROCESS THE USER'S BUSINESS DATA TO IDENTIFY AND EXTRACT USER'S BUSINESS ATTRIBUTE DATA OPERATION 623.

In one embodiment, at PROCESS THE USER'S BUSINESS DATA TO IDENTIFY AND EXTRACT USER'S BUSINESS ATTRIBUTE DATA OPERATION 623, the user's business data of OBTAIN ACCESS TO USER'S BUSINESS DATA ASSOCIATED WITH A GIVEN USER'S BUSINESS OPERATION 621 is processed to identify and extract user's business attribute data representing one or more business attributes for the user's business.

In various embodiments, the user's business attributes identified, extracted, and represented in the user's business attribute data of PROCESS THE USER'S BUSINESS DATA TO IDENTIFY AND EXTRACT USER'S BUSINESS ATTRIBUTE DATA OPERATION 623, include, but are not limited to, any one or more of the business attributes discussed herein above, or that are known in the art at the time of filing, or as become known after the time of filing.

In one embodiment, once the user's business data is processed to identify and extract user's business attribute data representing one or more business attributes for the user's business at PROCESS THE USER'S BUSINESS DATA TO IDENTIFY AND EXTRACT USER'S BUSINESS ATTRIBUTE DATA OPERATION 623, process flow proceeds to OBTAIN ACCESS TO AVAILABLE SPECIALIST DATA ASSOCIATED WITH ONE OR MORE CURRENTLY AVAILABLE SPECIALISTS OPERATION 625.

In one embodiment, at OBTAIN ACCESS TO AVAILABLE SPECIALIST DATA ASSOCIATED WITH ONE OR MORE CURRENTLY AVAILABLE SPECIALISTS OPERATION 625, access to available specialist data associated with one or more currently available specialists is obtained.

In one embodiment, at OBTAIN ACCESS TO AVAILABLE SPECIALIST DATA ASSOCIATED WITH ONE OR MORE CURRENTLY AVAILABLE SPECIALISTS OPERATION 625, the available specialist data is obtained from any source of available specialist data as discussed herein, or as available or known at the time of filing, or as made available or known after the time of filing.

In one embodiment, the available specialist data of OBTAIN ACCESS TO AVAILABLE SPECIALIST DATA ASSOCIATED WITH ONE OR MORE CURRENTLY AVAILABLE SPECIALISTS OPERATION 625 includes, but is not limited to, any available specialist data as discussed herein, or as available or known at the time of filing, or as made available or known after the time of filing.

In one embodiment, once access to available specialist data associated with one or more currently available specialists is obtained at OBTAIN ACCESS TO AVAILABLE SPECIALIST DATA ASSOCIATED WITH ONE OR MORE CURRENTLY AVAILABLE SPECIALISTS OPERATION 625, process flow proceeds to PROCESS THE AVAILABLE SPECIALIST DATA TO IDENTIFY AND EXTRACT AVAILABLE SPECIALIST ATTRIBUTE DATA FOR EACH AVAILABLE SPECIALIST REPRESENTED IN THE AVAILABLE SPECIALIST DATA OPERATION 627.

In one embodiment, at PROCESS THE AVAILABLE SPECIALIST DATA TO IDENTIFY AND EXTRACT AVAILABLE SPECIALIST ATTRIBUTE DATA FOR EACH AVAILABLE SPECIALIST REPRESENTED IN THE AVAILABLE SPECIALIST DATA OPERATION 627, the available specialist data of OBTAIN ACCESS TO AVAILABLE SPECIALIST DATA ASSOCIATED WITH ONE OR MORE CURRENTLY AVAILABLE SPECIALISTS OPERATION 625, is processed to identify and extract available specialist attribute data for each available specialist represented in the available specialist data.

In various embodiments, the available specialist attributes identified, extracted, and represented in the available specialist attribute data of PROCESS THE AVAILABLE SPECIALIST DATA TO IDENTIFY AND EXTRACT AVAILABLE SPECIALIST ATTRIBUTE DATA FOR EACH AVAILABLE SPECIALIST REPRESENTED IN THE AVAILABLE SPECIALIST DATA OPERATION 627 include, but are not limited to, any one or more of the specialist attributes discussed herein above, or that are known in the art at the time of filing, or as become known after the time of filing.

In one embodiment, once the available specialist data is processed to identify and extract available specialist attribute data for each available specialist represented in the available specialist data at PROCESS THE AVAILABLE SPECIALIST DATA TO IDENTIFY AND EXTRACT AVAILABLE SPECIALIST ATTRIBUTE DATA FOR EACH AVAILABLE SPECIALIST REPRESENTED IN THE AVAILABLE SPECIALIST DATA OPERATION 627, process flow proceeds to PROVIDE THE USER'S BUSINESS ATTRIBUTE DATA AND THE AVAILABLE SPECIALIST ATTRIBUTE DATA FOR EACH AVAILABLE SPECIALIST TO THE BUSINESS-SPECIALIST MATCHING MODEL OPERATION 629.

In one embodiment, at PROVIDE THE USER'S BUSINESS ATTRIBUTE DATA AND THE AVAILABLE SPECIALIST ATTRIBUTE DATA FOR EACH AVAILABLE SPECIALIST TO THE BUSINESS-SPECIALIST MATCHING MODEL OPERATION 629, the user's business attribute data of PROCESS THE USER'S BUSINESS DATA TO IDENTIFY AND EXTRACT USER'S BUSINESS ATTRIBUTE DATA OPERATION 623 and the available specialist attribute data of PROCESS THE AVAILABLE SPECIALIST DATA TO IDENTIFY AND EXTRACT AVAILABLE SPECIALIST ATTRIBUTE DATA FOR EACH AVAILABLE SPECIALIST REPRESENTED IN THE AVAILABLE SPECIALIST DATA OPERATION 627 for each available specialist represented in the available specialist data is provided to the business-specialist matching model of TRAIN A BUSINESS-SPECIALIST MATCHING MODEL OPERATION 619.

In one embodiment, once the user's business attribute data and the available specialist attribute data for each available specialist represented in the available specialist data is provided to the business-specialist matching model at PROVIDE THE USER'S BUSINESS ATTRIBUTE DATA AND THE AVAILABLE SPECIALIST ATTRIBUTE DATA FOR EACH AVAILABLE SPECIALIST TO THE BUSINESS-SPECIALIST MATCHING MODEL OPERATION 629, process flow proceeds to GENERATE SPECIALIST RECOMMENDATION DATA INDICATING AVAILABLE SPECIALISTS RECOMMENDED FOR THE USER'S BUSINESS OPERATION 631

In one embodiment, at GENERATE SPECIALIST RECOMMENDATION DATA INDICATING AVAILABLE SPECIALISTS RECOMMENDED FOR THE USER'S BUSINESS OPERATION 631 using the user's business attribute data of PROCESS THE BUSINESS MODEL TRAINING DATA TO IDENTIFY AND EXTRACT BUSINESS ATTRIBUTE MODEL TRAINING DATA OPERATION 607 and the available specialist attribute data of PROCESS THE SPECIALIST MODEL TRAINING DATA TO IDENTIFY AND EXTRACT SPECIALIST ATTRIBUTE MODEL TRAINING DATA OPERATION 613, the business-specialist matching model of TRAIN A BUSINESS-SPECIALIST MATCHING MODEL OPERATION 619 generates specialist recommendation data indicating available specialists recommended for the user's business.

In one embodiment, once the user's business attribute data, the available specialist attribute data, and the business-specialist matching model, are used to generate specialist recommendation data indicating available specialists recommended for the user's business at GENERATE SPECIALIST RECOMMENDATION DATA INDICATING AVAILABLE SPECIALISTS RECOMMENDED FOR THE USER'S BUSINESS OPERATION 631, process flow proceeds to PROVIDE THE SPECIALIST RECOMMENDATION DATA TO THE USER OPERATION 633.

In one embodiment, at PROVIDE THE SPECIALIST RECOMMENDATION DATA TO THE USER OPERATION 633, the specialist recommendation data is provided to the user, the user's business, or one or more user computing systems accessible by the user or the user's business.

In one embodiment, the specialist recommendation data of PROVIDE THE SPECIALIST RECOMMENDATION DATA TO THE USER OPERATION 633 includes a listing of multiple recommended specialists.

In one embodiment, the specialist recommendation data of PROVIDE THE SPECIALIST RECOMMENDATION DATA TO THE USER OPERATION 633 includes a listing of multiple recommended specialists along with portions of their associated specialist data and why the specialist is being recommended.

In one embodiment, the specialist recommendation data of PROVIDE THE SPECIALIST RECOMMENDATION DATA TO THE USER OPERATION 633 includes a probability score or display indicating the calculated probability the specialists listed are a good match for the user.

In one embodiment, once the specialist recommendation data is provided to the user, the user's business, or one or more user computing systems accessible by the user or the user's business at PROVIDE THE SPECIALIST RECOMMENDATION DATA TO THE USER OPERATION 633, user's business specialist satisfaction data associated with one or more available specialists included in the specialist recommendation data is obtained from one or more of the user, user's business, and a computing system associated with the user or the user's business. In one embodiment, the user's business specialist satisfaction data indicates the user's business' satisfaction with the one or more available specialists included in the specialist recommendation data.

In one embodiment, once the user's business specialist satisfaction data associated with one or more available specialists included in the specialist recommendation data of PROVIDE THE SPECIALIST RECOMMENDATION DATA TO THE USER OPERATION 633, is obtained, the user's business specialist satisfaction data, the user's business attribute data of PROCESS THE USER'S BUSINESS DATA TO IDENTIFY AND EXTRACT USER'S BUSINESS ATTRIBUTE DATA OPERATION 623, and at least part of the available specialist attribute data of PROCESS THE AVAILABLE SPECIALIST DATA TO IDENTIFY AND EXTRACT AVAILABLE SPECIALIST ATTRIBUTE DATA FOR EACH AVAILABLE SPECIALIST REPRESENTED IN THE AVAILABLE SPECIALIST DATA OPERATION 627 for the one or more available specialists included in the specialist recommendation data, are provided and used as online training data for the business-specialist matching model of PROVIDE THE BUSINESS ATTRIBUTE MODEL TRAINING DATA, THE SPECIALIST ATTRIBUTE MODEL TRAINING DATA, AND THE BUSINESS SATISFACTION DATA TO A BUSINESS-SPECIALIST MATCHING MODEL AS MODEL TRAINING DATA OPERATION 617 and TRAIN A BUSINESS-SPECIALIST MATCHING MODEL OPERATION 619.

In one embodiment, the user's business specialist satisfaction data is used to modify the business-specialist matching model of the specialist recommendation module in an online environment.

In one embodiment, once the specialist recommendation data is provided to the user, the user's business, or one or more user computing systems accessible by the user or the user's business at PROVIDE THE SPECIALIST RECOMMENDATION DATA TO THE USER OPERATION 633, process flow proceeds to EXIT OPERATION 640.

In one embodiment, at EXIT OPERATION 640, process 600 for matching specialists and potential clients is exited to await new data.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining," "training," "extracting," "executing," "mapping," "analyzing," "providing," "enforcing," "monitoring," "generating," "defining," "determining," "calculating," "transforming," "correlating," "normalizing," "accessing," "analyzing," "obtaining," "identifying," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or another device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the figures are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

The invention claimed is:

1. A system for matching specialists and potential clients, the system comprising:
   one or more processors; and
   at least one memory coupled to the one or more processors and storing instructions that, when executed by the one or more processors, cause the system to perform operations including:
      obtaining client data associated with a plurality of clients, wherein each of the clients is a potential client of one or more of a plurality of specialists;
      identifying and extracting client attributes associated with the plurality of clients based on the client data;
      obtaining specialist data associated with a plurality of specialists able to provide assistance to a client;
      identifying and extracting specialist attributes associated with the plurality of specialists based on the specialist data;
      obtaining satisfaction data indicating, for each of the plurality of clients, a level of satisfaction with one or more of the plurality of specialists;
      identifying correlations between the extracted client attributes and the extracted specialist attributes based on the satisfaction data;
      generating a plurality of attribute pairs based on the identified correlations, each of the attribute pairs matching one of the plurality of clients with one of the plurality of specialists according to the indicated levels of satisfaction;
      transforming the plurality of attribute pairs into correlation training data;
      training, using the correlation training data as input, a machine learning model to predict user levels of satisfaction with specialists of the plurality of specialists, the machine learning model including at least one of a random forest model, a decision tree model, or a logistic regression model;
      identifying and extracting current user attributes associated with a current user;
      identifying and extracting current specialist attributes associated with currently available specialists; and
      generating, using the current user attributes and the current specialist attributes as inputs to the trained machine learning model, and for each respective specialist of the currently available specialists, a matching score indicating a likelihood that the current user will be satisfied with services provided by the respective specialist.

2. The system of claim 1, wherein the machine learning model is a supervised machine learning model.

3. The system of claim 1, wherein:
   the client data is associated with potential client model training data;
   the specialist data is associated with specialist model training data; and
   training the machine learning model is further based on the potential client model training data and the specialist model training data.

4. The system of claim 3, wherein the specialist model training data includes at least one of personal data, demographic data, specialty data, education data, employment data, experience data, certification data, or client data.

5. The system of claim 1, wherein:
   the client data is generated based on a transformation of raw client data associated with the plurality of clients, and
   the specialist data is generated based on a transformation of raw specialist data associated with the plurality of specialists.

6. The system of claim 5, wherein the raw client data includes at least one of operational data, transactional data, clickstream data, organizational and tax data, or employment data.

7. The system of claim 5, wherein the raw specialist data includes at least one of personal data, demographic data, specialty data, education data, employment data, experience data, certification data, or client data.

8. The system of claim 1, wherein the machine learning model is at least one of:
   a supervised machine learning model,
   an unsupervised machine learning model, or
   a semi-supervised machine learning model.

9. The system of claim 1, wherein the machine learning model is a multiclass Support Vector Machine and decision tree model.

10. The system of claim 1, wherein execution of the instructions causes the system to perform operations further including:
    providing the satisfaction data as online training data for the machine learning model; and
    using the satisfaction data to modify the machine learning model in an online environment.

11. The system of claim 1, wherein:
    the client attributes are extracted using a feature engineering module including an attribute data extraction engine,
    the specialist attributes are extracted using a specialist feature engineering module including a specialist attribute data extraction engine, and
    the plurality of attribute pairs are transformed using a model training data correlation module including a satisfaction correlation engine.

12. The system of claim 1, wherein execution of the instructions causes the system to perform operations further comprising:
    generating a plurality of potential matches for the current user, each of the potential matches including an available specialist having a matching score greater than a value;
    generating recommendation data indicating the specialists included within the plurality of potential matches; and
    providing the recommendation data to the user.

13. A method for matching specialists and potential clients, the method performed by one or more processors of a system and comprising:

obtaining client data associated with a plurality of clients, wherein each of the clients is a potential client of one or more of a plurality of specialists;

identifying and extracting client attributes associated with the plurality of clients based on the client data;

obtaining specialist data associated with a plurality of specialists able to provide assistance to a client;

identifying and extracting specialist attributes associated with the plurality of specialists based on the specialist data;

obtaining satisfaction data indicating, for each of the plurality of clients, a level of satisfaction with one or more of the plurality of specialists;

identifying correlations between the extracted client attributes and the extracted specialist attributes based on the satisfaction data;

generating a plurality of attribute pairs based on the identified correlations, each of the attribute pairs matching one of the plurality of clients with one of the plurality of specialists according to the indicated levels of satisfaction;

transforming the plurality of attribute pairs into correlation training data;

training, using the correlation training data as input, a machine learning model to predict user levels of satisfaction with specialists of the plurality of specialists, the machine learning model including at least one of a random forest model, a decision tree model, or a logistic regression model;

identifying and extracting current user attributes associated with a current user;

identifying and extracting current specialist attributes associated with currently available specialists; and generating, using the current user attributes and the current specialist attributes as inputs to the trained machine learning model, and for each respective specialist of the currently available specialists, a matching score indicating a likelihood that the current user will be satisfied with services provided by the respective specialist.

14. The method of claim 13, further comprising:

generating a plurality of potential matches for the current user, each of the potential matches including an available specialist having a matching score greater than a value;

generating recommendation data indicating the specialists included within the plurality of potential matches; and providing the recommendation data to the user.

15. A non-transitory computer-readable medium storing instructions that, when executed by one or more processors of a system, cause the system to perform operations including:

obtaining client data associated with a plurality of clients, wherein each of the clients is a potential client of one or more of a plurality of specialists;

identifying and extracting client attributes associated with the plurality of clients based on the client data;

obtaining specialist data associated with a plurality of specialists able to provide assistance to a client;

identifying and extracting specialist attributes associated with the plurality of specialists based on the specialist data;

obtaining satisfaction data indicating, for each of the plurality of clients, a level of satisfaction with one or more of the plurality of specialists;

identifying correlations between the extracted client attributes and the extracted specialist attributes based on the satisfaction data;

generating a plurality of attribute pairs based on the identified correlations, each of the attribute pairs matching one of the plurality of clients with one of the plurality of specialists according to the indicated levels of satisfaction;

transforming the plurality of attribute pairs into correlation training data;

training, using the correlation training data as input, a machine learning model to predict user levels of satisfaction with specialists of the plurality of specialists, the machine learning model including at least one of a random forest model, a decision tree model, or a logistic regression model;

identifying and extracting current user attributes associated with a current user;

identifying and extracting current specialist attributes associated with currently available specialists; and generating, using the current user attributes and the current specialist attributes as inputs to the trained machine learning model, and for each respective specialist of the currently available specialists, a matching score indicating a likelihood that the current user will be satisfied with services provided by the respective specialist.

16. The non-transitory computer-readable medium of claim 15, wherein execution of the instructions causes the system to perform operations further comprising:

generating a plurality of potential matches for the current user, each of the potential matches including an available specialist having a matching score greater than a value;

generating recommendation data indicating the specialists included within the plurality of potential matches; and providing the recommendation data to the user.

\* \* \* \* \*